United States Patent
Baba

(10) Patent No.: US 8,248,655 B2
(45) Date of Patent: Aug. 21, 2012

(54) IMAGE FORMING APPARATUS FOR PRINTING IMAGES BASED ON DOCUMENT POSITION AND BINDING DIRECTION USING MANUAL OR AUTOMATIC FEEDING FUNCTION

(75) Inventor: Masaki Baba, Kobe (JP)

(73) Assignee: Kyocera Document Solutions Inc. (JP)

( * ) Notice: Subject to any disclaimer, the term of this patent is extended or adjusted under 35 U.S.C. 154(b) by 940 days.

(21) Appl. No.: 12/021,626

(22) Filed: Jan. 29, 2008

(65) Prior Publication Data
US 2008/0285065 A1    Nov. 20, 2008

(30) Foreign Application Priority Data

Jan. 31, 2007  (JP) ............................... P2007-021801
Mar. 6, 2007   (JP) ............................... P2007-055353

(51) Int. Cl.
- *H04N 1/40* (2006.01)
- *H04N 1/04* (2006.01)
- *G03G 15/00* (2006.01)

(52) U.S. Cl. ......... 358/1.2; 358/449; 358/488; 358/496; 358/497; 399/86; 399/364; 399/370; 399/376; 399/395; 399/408

(58) Field of Classification Search ........................ None
See application file for complete search history.

(56) References Cited

U.S. PATENT DOCUMENTS
- 5,602,651 A * 2/1997 Tabata et al. ................. 358/448
- 2001/0014229 A1 * 8/2001 Nakata et al. ................. 399/82
- 2003/0049062 A1 * 3/2003 Machida ........................ 399/371
- 2006/0133844 A1   6/2006 Konno
- 2006/0227389 A1 * 10/2006 Yamamoto et al. ........... 358/496

FOREIGN PATENT DOCUMENTS
| CN | 1794105      |   | 6/2006 |
|----|--------------|---|--------|
| JP | 2002-125102  |   | 4/2002 |
| JP | 2002125102   | * | 4/2002 |
| JP | 2004120798   |   | 4/2004 |
| JP | 2005-268893  |   | 9/2005 |

OTHER PUBLICATIONS

Yokota Masahiko; "image forming device and Image formaing method"; JP Pub Date Apr. 2002; English machine translation of JP Pub No. 2002-125102.*

Yokoto Masahiko; "Image Forming . . . Forming Method"; JP Pub Date Apr. 2002; Machine Translation in English of JP Pub No. 2002125102.*

* cited by examiner

*Primary Examiner* — Benny Q Tieu
*Assistant Examiner* — Haris Sabah
(74) *Attorney, Agent, or Firm* — Ostrolenk Faber LLP

(57) ABSTRACT

An image forming apparatus which has a double-side copying function, including: at least either one of an original document detection section that detects a size of an original document, and an original document size setting section that sets a size of the original document as required; an original document top position setting section that sets a top position of the original document as required; a binding direction setting section that sets a binding direction of the original document and a binding direction of an output sheet as required; an output size setting section that sets a size of the output sheet as required; a print magnification ratio setting section that sets a print magnification ratio as required; and a copy region determination section that sets a copy region with reference to a top left corner of the original document, the top left corner being identified when the original document is placed such that the top position thereof is upward.

12 Claims, 21 Drawing Sheets

IMAGE FORMING APPARATUS FOR PRINTING IMAGES BASED ON DOCUMENT POSITION AND BINDING DIRECTION USING MANUAL OR AUTOMATIC FEEDING FUNCTION

Priority is claimed on Japanese Patent Application No. 2007-021801, filed on Jan. 31, 2007, and Japanese Patent Application No. 2007-055353, filed on Mar. 6, 2007, the contents of which are incorporated herein by reference.

BACKGROUND OF THE INVENTION

1. Field of the Invention

The present invention relates to an image forming apparatus.

2. Description of the Related Art

Conventionally, an image forming apparatus is commonly known in which one side of a plurality of original documents is scanned and recorded and the original document is printed (recorded) on both sides of a recording sheet (output sheet), or both sides of the original document are scanned and recorded and the original document is printed on both or one side of a recording sheet. In various kinds of double-side recording modes of the above image forming apparatus, printing may be performed at $\beta$ times print magnification on a recording sheet the size of which is $\alpha$ times of an original document.

There is no problem in the case of $\alpha=\beta$ because it is a simple enlargement/reduction printing. However, in the case of $\alpha \neq \beta$, images of the original document are recorded with some displacement on the front face and the back face of the recording sheet in some cases. There is known an image forming apparatus that solves this problem without using a memory or the like (for example, refer to Japanese Unexamined Patent Application, First Publication No. 2002-125102).

Incidentally, in the image forming apparatus related to the above conventional technique, original document binding directions, top positions of original documents, and double-side scanning methods for original documents (simultaneous scanning/alternate scanning) are not considered. As a result, in the above apparatus provided with a flip-up type automatic document feeding device capable of double-side scanning, except for the case where the back face of a left-right binding original document is scanned from the rear end, there is a problem in that for example, an output image region is displaced if the top position of the back face of an original document is positioned at the rear end (top-bottom binding). That is to say, in the case of double-side copying, in particular, it is impossible to estimate what portion of the back face of an original document is printed on what portion of a recording sheet, resulting in a problem that a double-side copying, which is not intended by the user, is performed.

The present invention takes the above circumstances into consideration and has an object of providing an image forming apparatus capable of reliably performing copying/printing the user's intended range on an original document when copying both sides of the original document onto an output sheet.

SUMMARY OF THE INVENTION

In order to solve the above-described problems, the present invention employs the followings. Namely, the present invention employs an image forming apparatus which has a double-side copying function, including: at least either one of an original document detection section that detects a size of an original document, and an original document size setting section that sets a size of the original document as required; an original document top position setting section that sets a top position of the original document as required; a binding direction setting section that sets a binding direction of the original document and a binding direction of an output sheet as required; an output size setting section that sets a size of the output sheet as required; a print magnification ratio setting section that sets a print magnification ratio as required; and a copy region determination section that sets a copy region with reference to a top left corner of the original document, the top left corner being identified when the original document is placed such that the top position thereof is upward.

According to the above image forming apparatus, a region on the original document to be printed on an output sheet can be determined by the copy region determination section that determines the copy region on the original document based on conditions set by the respective setting sections with reference to the top left corner which can be identified when the original document is placed such that the top position thereof is upward.

Therefore, when copying the original document, the user's intended range can be reliably determined.

It may be arranged such that the image forming apparatus further includes: an image processing section that performs image processing on scanned original document data based on a print magnification ratio set by the print magnification ratio setting section, and a copy region set by the copy region determining section; and a printing section that prints onto the output sheet an image corresponding to the data that has been image-processed by the image processing section.

In this case, the user's intended range on the original document can be reliably copied at a required magnification ratio by printing the corresponding data based on the range determined by the copy region determination section and the print magnification ratio set by the print magnification ratio setting section.

It may be arranged such that in a case where a binding direction of an original document and a binding direction of an output sheet set by the binding direction setting section are different from each other, an image on a back face of an original document is printed by the printing section while being rotated 180 degrees within a plane thereof.

In this case, even if the binding direction of the original document differs from the binding direction of the output sheet, the user's intended range on the original document can be reliably printed.

In addition, the present invention also employs an image forming apparatus which has a double-side copying function, including: at least either one of an original document detection section that detects a size of an original document, and an original document size setting section that sets a size of the original document as required; an original document top position setting section that sets a top position of the original document as required; a binding direction setting section that sets a binding direction of the original document and a binding direction of an output sheet as required; an output size setting section that sets a size of the output sheet as required; a print magnification ratio setting section that sets a print magnification ratio as required; a print region determination section that sets a print region with reference to a top left corner of the original document, the top left corner being identified when the original document is placed such that the top position thereof is upward; and a data box that stores data of a scanned original document.

According to the above image forming apparatus, the original document can be made into data and stored into the data box with adding information with respect to the top position of the original document, the information being determined based on the parameters pre-set by the respective setting sections. For this reason, when printing the stored original document data, the range on the original document to be printed on the output sheet can be determined only by setting information related to the output sheet with reference to the top left corner of the original document.

As a result, when printing the original document data stored in the data box, the user's intended range on the original document data can be easily and reliably determined.

It may be arranged such that the image forming apparatus further includes: an image processing section that performs image processing on original document data stored in the data box, based on a print magnification ratio set by the print magnification ratio setting section and a print region set by the print region setting section; and a printing section that prints onto an output sheet an image corresponding to the data that has been image-processed by the image processing section.

In this case, the user's intended range on the original document can be reliably copied at a required magnification ratio by printing the corresponding data based on the range determined by the copy region determination section and the print magnification ratio set by the print magnification ratio setting section.

It may be arranged such that in a case where a binding direction of an original document and a binding direction of an output sheet set by the binding direction setting section are different from each other, an image on a back face of an original document is printed by the printing section while being rotated 180 degrees within a plane thereof.

In this case, even if the binding direction of the original document differs from the binding direction of the output sheet, the user's intended range on the original document can be reliably printed.

BRIEF DESCRIPTION OF THE DRAWINGS

FIG. 7A and FIG. 7B are diagrams for explaining the orientation of the top of scanned original document data in the case where the original document is placed directly on a table according to the embodiment, wherein FIG. 7A shows a positional relationship between a scanner and the original document and FIG. 7B shows a data image of the original document scanned by the scanner.

FIG. 8A and FIG. 8B are diagrams for explaining the orientation of the top of scanned original document data in the case where the original document is placed on an ADF tray according to the embodiment, wherein FIG. 8A shows a positional relationship between the scanner and the original document and FIG. 8B shows a data image of the original document scanned by the scanner.

FIG. 18A and FIG. 18B are diagrams for explaining the orientation of the top of scanned original document data in the case where an original document is placed directly on a table according to the embodiment, wherein FIG. 18A shows a positional relationship between a scanner and the original document and FIG. 18B shows a data image of the original document scanned by the scanner.

FIG. 19A and FIG. 19B are diagrams for explaining the orientation of the top of scanned original document data in the case where the original document is placed on an ADF tray according to the embodiment, wherein FIG. 19A shows a positional relationship between the scanner and the original document and FIG. 19B shows a data image of the original document scanned by the scanner.

DETAILED DESCRIPTION OF THE INVENTION

A first embodiment of the present invention will be described, with reference to FIG. 1 to FIG. 11B. In the present embodiment, there is described a case of employing an image forming apparatus of the present invention in a copying machine.

Figure 1:
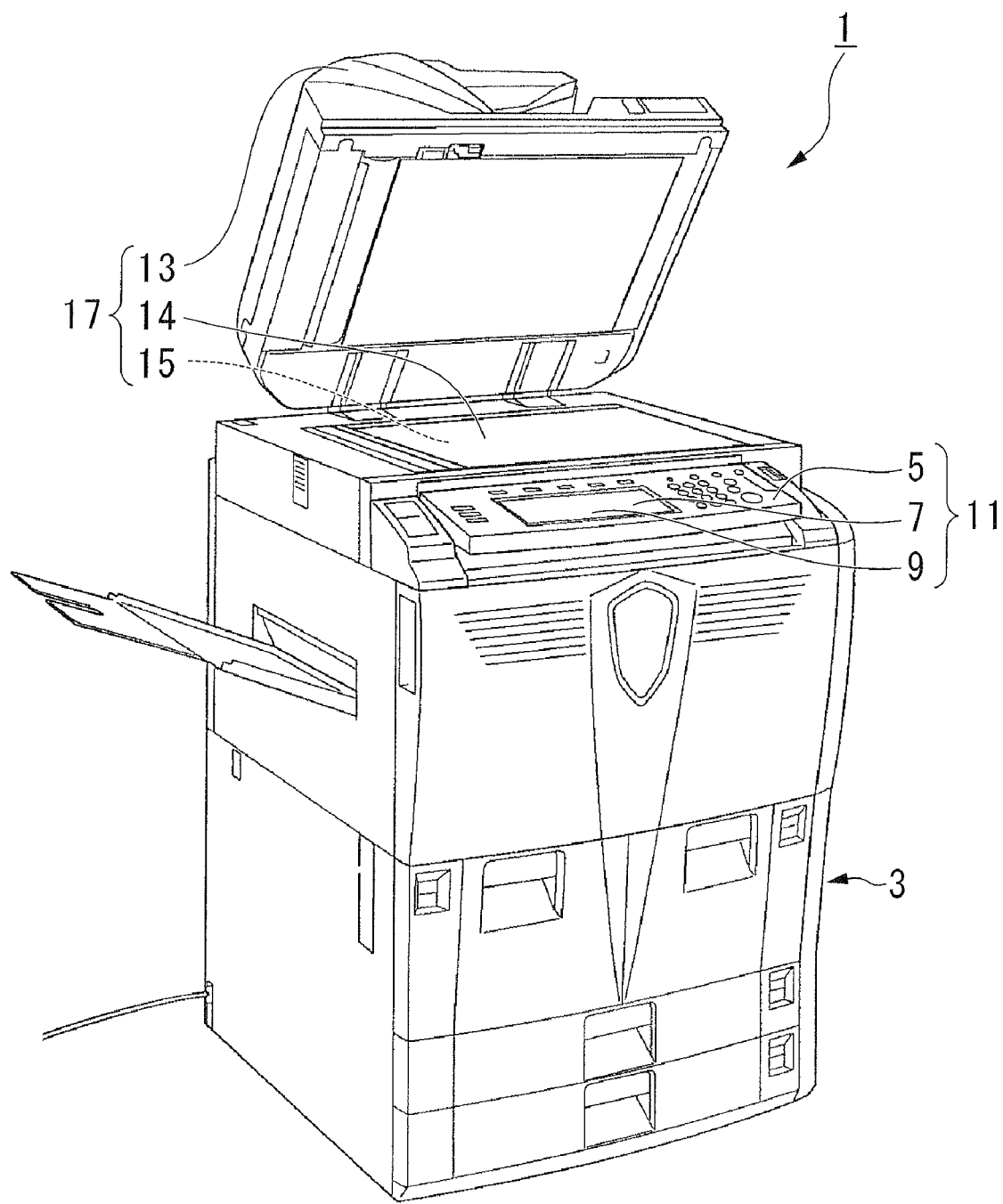
FIG. 1 is a perspective view of a copying machine according to a first embodiment of the present invention.

As shown in FIG. 1, a copying machine 1 is provided in the bottom part thereof with a copying machine main body 3 having an image storage section, an image processing section, a printing section, a control section, and so forth not shown in the diagram. On the top section front side of the copying machine 1, there is provided an operation display device 11 having an operation section 5 for executing various kinds of operations of the copying machine 1, and a display section 9 on the entire surface of which a touch panel 7 formed with a transparent electrode is arranged. In addition, on the top section of the copying machine 1, there is provided an image scanning section 17 having an automatic document feeding device (ADF) 13 for automatically feeding original documents, a table 14 formed with a transparent glass on which an original document is to be placed, and a scanner section 15 for scanning the original document.

Figure 2:
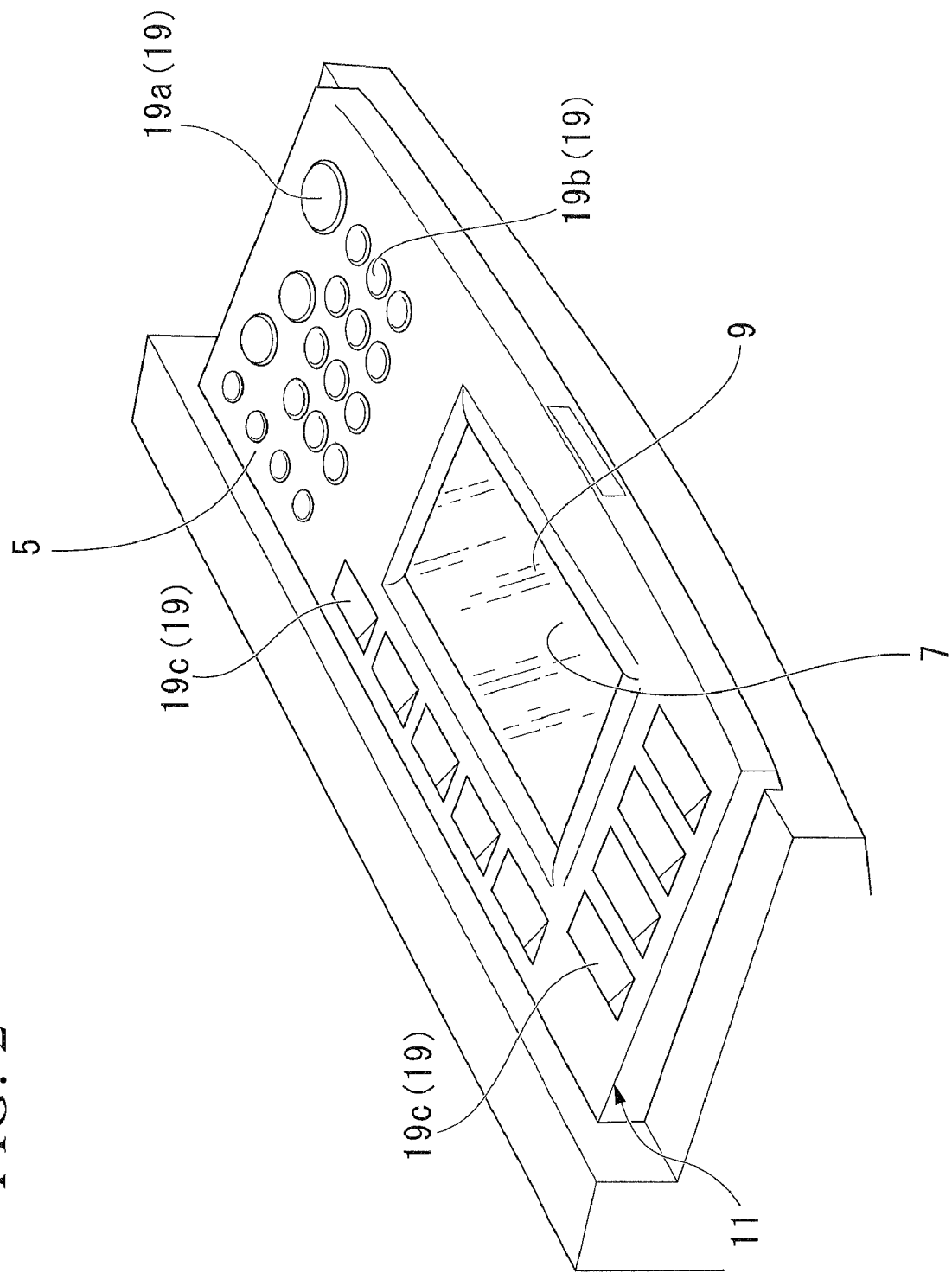
FIG. 2 is a perspective view of an operation display device according to the embodiment.

As shown in FIG. 2, the operation display device 11 is configured with the operation section 5 and the display section 9.

The operation section 5 is provided with a plurality of buttons 19 for receiving various kinds of operation instructions from a user and for outputting the contents of operation instructions to a control section 33. The buttons 19 include: a start key 19a for starting operations such as a copying operation; numeric keys 19b for setting the number of copies to be made; and function keys 19c for starting an initial setting screen.

Moreover, the display section 9 is configured with a color or monochrome liquid crystal display (LCD), and it displays various kinds of information in forms of various kinds of images, characters and figures, based on instructions inputted from the control section 33. Furthermore, the touch panel 7 functions with user's touch on the respective function keys displayed on the display section 9. The content of instructions inputted on the touch panel 7 is outputted to the control section 33.

Figure 3:
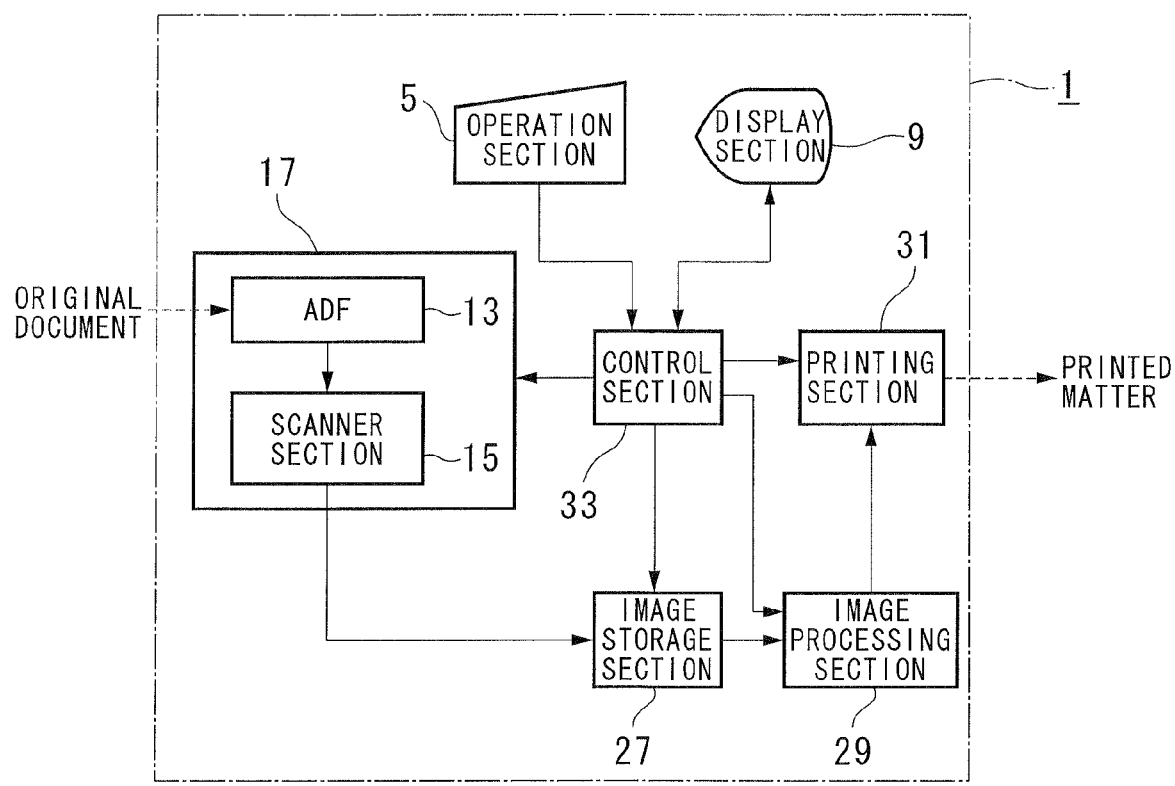
FIG. 3 is a block diagram of the copying machine according to the embodiment.

FIG. 3 shows a block diagram of the copying machine 1. As shown in this diagram, the functional aspect of the copy machine 1 is configured essentially with the operation section 5, the display section 9, the image scanning section 17, an image storage section 27, an image processing section 29, a printing section 31, the control section 33, and the like. Since the operation section 5 and the display section 9 are communicably connected to the control section 33 as mentioned above, transmission and reception of signals that correspond to the various kinds of operations for a plurality of functions can be performed.

The image scanning section 17 is provided with the automatic document feeding device (ADF) 13 and the scanner section 15 built into the copying machine main body 3. In the image scanning section 17, under the control of the control section 33, the scanner section 15 sequentially scans the image of an original document while the original document supplied from the automatic document feeding device 13 is being transferred onto the table 14. The scanned original document image is outputted to the image storage section 27 as color image data. Moreover, also in the case of where the original document is placed directly on the table 14, the image of the original document is scanned by the scanner section 15.

Furthermore, in order to scan both sides of an original document, the copying machine 1 is provided inside the ADF 13 with a scanner or a reversing mechanism for reversing the front side and the back side of the original document.

The image storage section 27 is configured essentially with an external storage device such as a hard disk drive, and/or with a semiconductor memory, and it stores the color image data of the original document inputted from the image scanning section 17. This image storage section 27, under the control of the control section 33, performs writing of the color image data of the scanned original document, and it reads the color image data and outputs it to the image processing section 29.

The image processing section 29, under the control of the control section 33, converts the color image data inputted from the image storage section 27 into data for printing and outputs it to the printing section 31.

The printing section 31, under the control of the control section 33, transfers a printing sheet while attaching toners thereon, thereby outputting the original document image on the printing sheet based on the above color image data (printing section).

The control section 33 controls the overall behavior of the copying machine 1 based on: operation instructions inputted from the operation section 5 or from the touch panel 7 of the display section 9; a control program stored in a built-in memory; and various kinds of control data. To perform the above-described control, the control section 33 is configured essentially with: a CPU (central processing unit) that performs control calculations based on the operation instructions, the control program and various kinds of control data; and with various kinds of input/output interface circuits that perform data communication with the respective other sections (e.g., the operation section 5, the display section 9, the image scanning section 17, the image storage section 27, the image processing section 29, and the printing section 31). By performing overall control of the respective other sections mentioned above, the control section 33 is able to perform printing, in the printing section 31, of the original document image scanned by the image scanning section 17, using its copying function.

Next, the flow of operations for double-side printing with use of the copying machine 1 will be described, with reference to the flow chart in FIG. 4.

Figure 4:
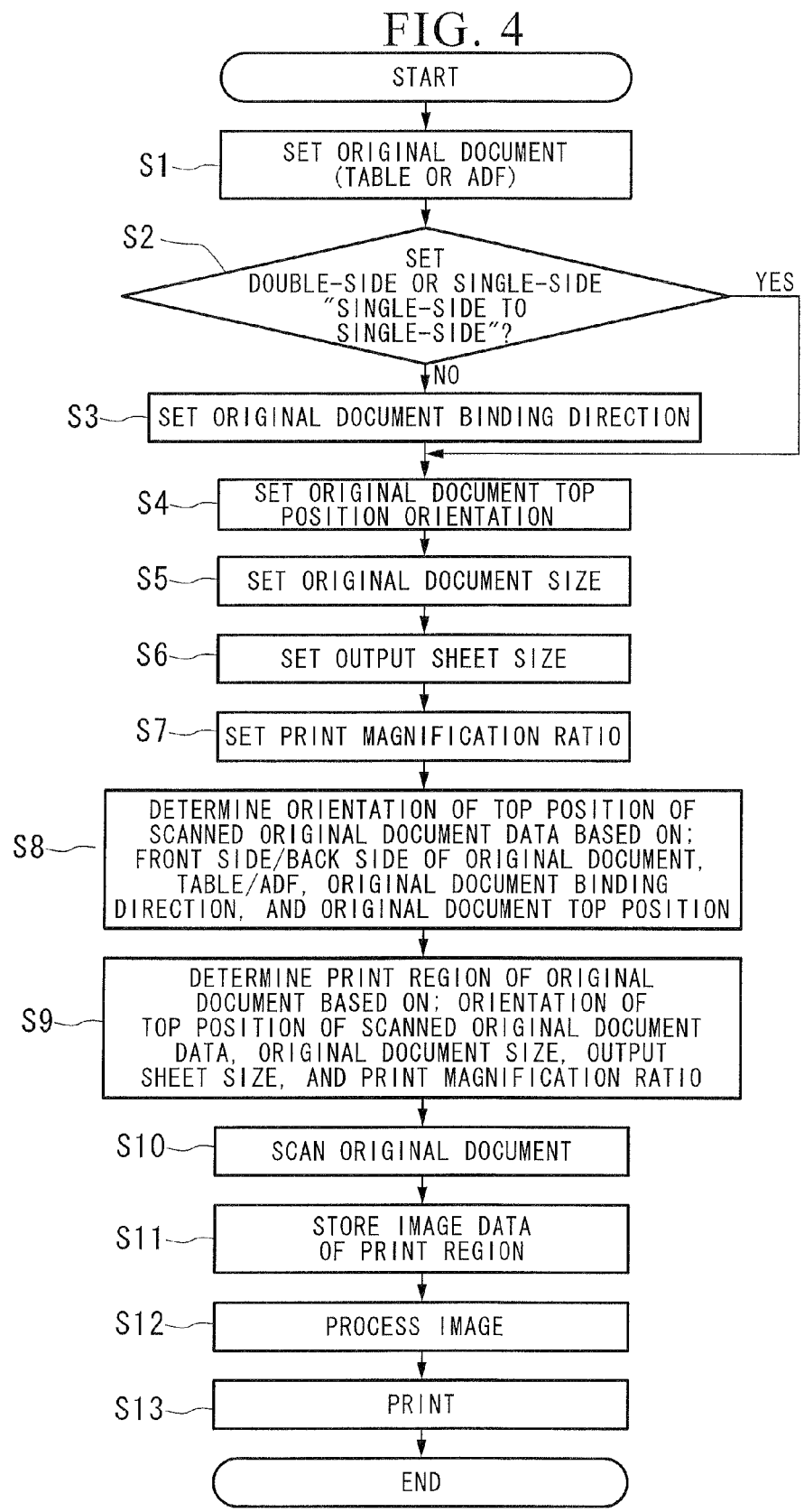
FIG. 4 is a flow chart showing the flow of operations performed when using a double-side copying function of the copying machine according to the embodiment.

As shown in FIG. 4, in step 1 (S1), a sensor (not shown in the diagram) detects whether or not an original document has been set on the tray of the ADF 13 or whether or not the original document has been set directly on the table 14. When an original document has been set on either of the above, the flow proceeds to step 2 (S2).

In step 2, either double-side printing or single-side printing to be performed is set. More specifically, any one of "double-side to double-side", "double-side to single-side", "single-side to double-side", and "single-side to single-side" can be selected as a setting pattern. Since it is usually set in "single-side to single-side", a desired pattern is to be selected with the function keys displayed on the display section 9 when another pattern needs to be selected. Here, if "double-side to double-side", "double-side to single-side", or "single-side to double-side" is set, the flow proceeds to step 3 (S3). If "single-side to single-side" is set, then the flow proceeds to step 4 (S4).

In step 3, the binding direction of the original document and the binding direction of a printed output sheet are set (binding direction setting section). The options of binding directions are "left-right binding" and "top-bottom binding", and either one of these is selected. If "double-side to double-side" was selected in step 2, then the binding directions of both the original document and the printed output sheet are set; if "double-side to single-side" was selected, then only the binding direction of the original document is set; and if "single-side to both-side" was selected, then only the binding direction of the printed output sheet is set. When the binding direction has been set, the flow proceeds to step 4.

Figure 5:
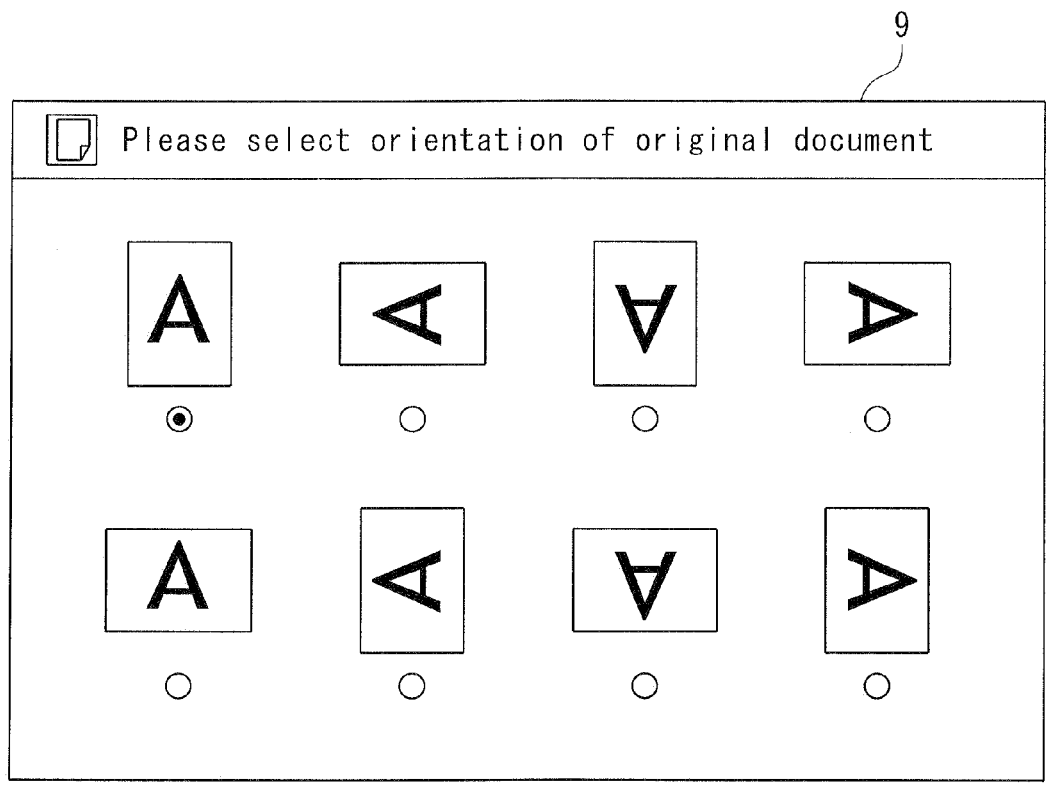
FIG. 5 is an explanatory diagram showing a display section when setting the top position of an original document according to the embodiment.

In step 4, the orientation of the top position of the original document when printing is performed is set (original document top position setting section). Here, the top position of the original document refers to the position of the top part of the original document which is defined according to the orientation of characters and images on the original document. As shown in FIG. 5, the orientation of the original document is selected from eight patterns displayed on the display section 9. In the case where the original document is set on the tray of the ADF 13, the orientation of the original document when placed on the tray with the front face (odd number original document) up is selected. On the other hand, in the case where the original document is set on the table 14, the orientation of the original document when placed such that the front face faces the scanner section 15 is selected. When the top position of the original document has been set, the flow proceeds to step 5 (S5).

Returning to FIG. 4, in step 5, the size of the original document is determined. The size of the original document is determined either; by automatically detecting the size with a sensor which is provided in the copying machine 1 and is not shown in the diagram (original document detection section), or by manually setting the size on the display section 9 (original document size setting section). In particular, in the case where the size of the original document is irregular and the size cannot be accurately recognized through automatic detection, the original document size can be determined by performing manual setting. When the size of the original document has been set, the flow proceeds to step 6 (S6).

In step 6, the size of the output sheet is determined (output size setting section). By operating the display section 9, the size of the sheet on which printing is to be outputted (printed) is determined. When the size of the output sheet has been determined, the flow proceeds to step 7 (S7).

In step 7, a print magnification ratio for the output sheet is set (print magnification ratio setting section). By operating the display section 9, the percentage of the print size compared to the original document print size is set. When the print magnification ratio has been set, the flow proceeds to step 8 (S8).

In step 8, the orientation of the top of the scanned original document data is determined in the control section 33 based on; the front side/back side (odd number page or even number page) of the original document, the position in which the original document is set (table 14 or ADF 13), the binding direction of the original document, and the top position of the original document. The term "orientation of the top of the original document data" as used herein refers to an orientation of the top of original document data scanned by the scanner section 15. When the orientation of the top of the scanned original document data has been set, the flow proceeds to step 9 (S9).

Figure 6:
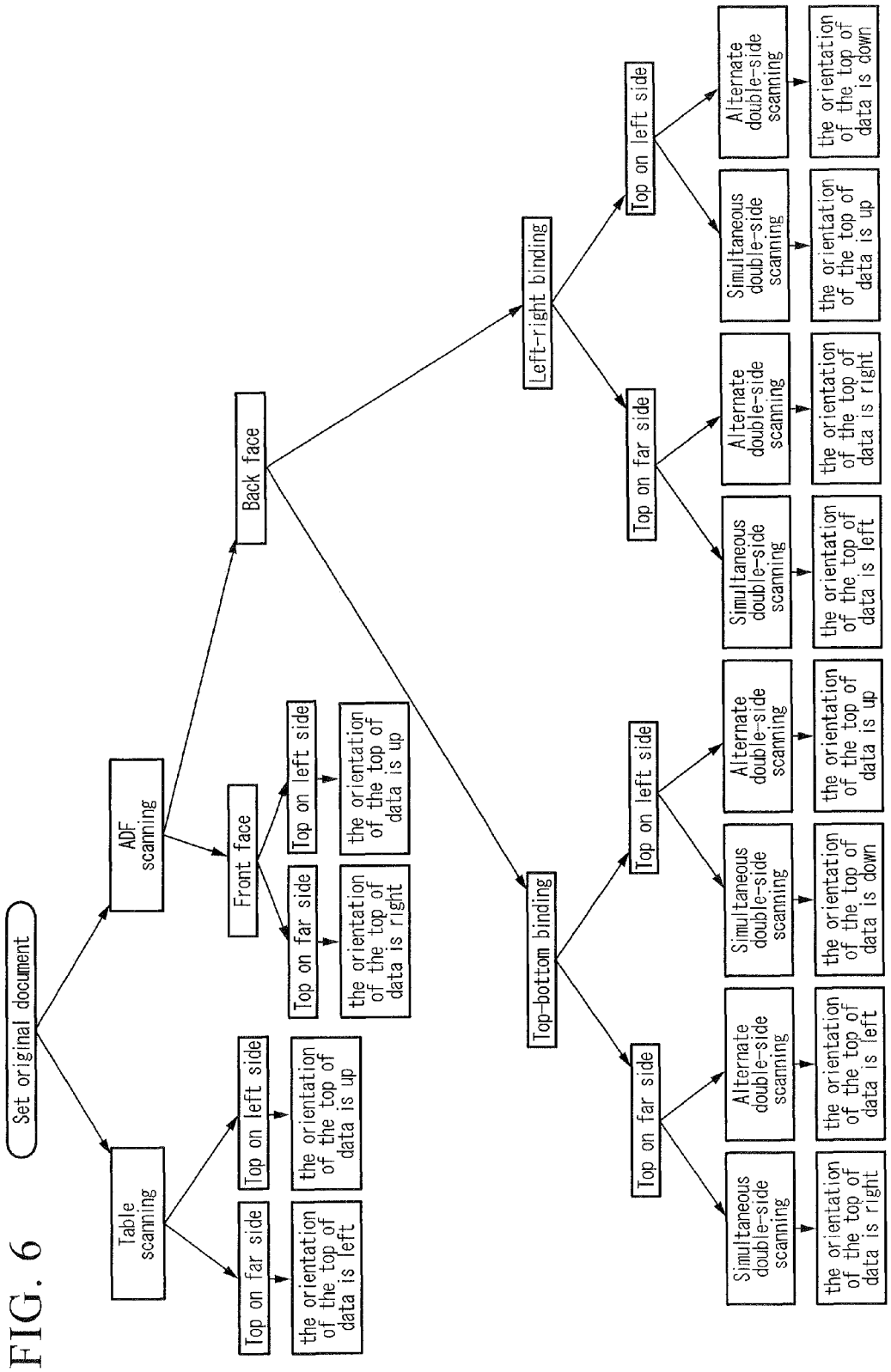
FIG. 6 is an explanatory diagram showing the flow of determining the orientation of the top of scanned original document data in the copying machine according to the embodiment.

The above orientation of the top of the original document data is respectively determined according to various kinds of conditions as shown in FIG. 6. In FIG. 6, only the case where the top position of the original document directs the far side (the top position of the original document is positioned on the side furthest from the user) or where it directs the left side (the top position of the original document is positioned on the left side of the user) is described. This is because often original documents are mainly placed in the far side facing orientation or in the left side facing orientation. Also in the case where the original document is placed with its top position facing the near side or the right side when seen from the user, the orientation of the top of the original document data can be determined.

Figure 7A:
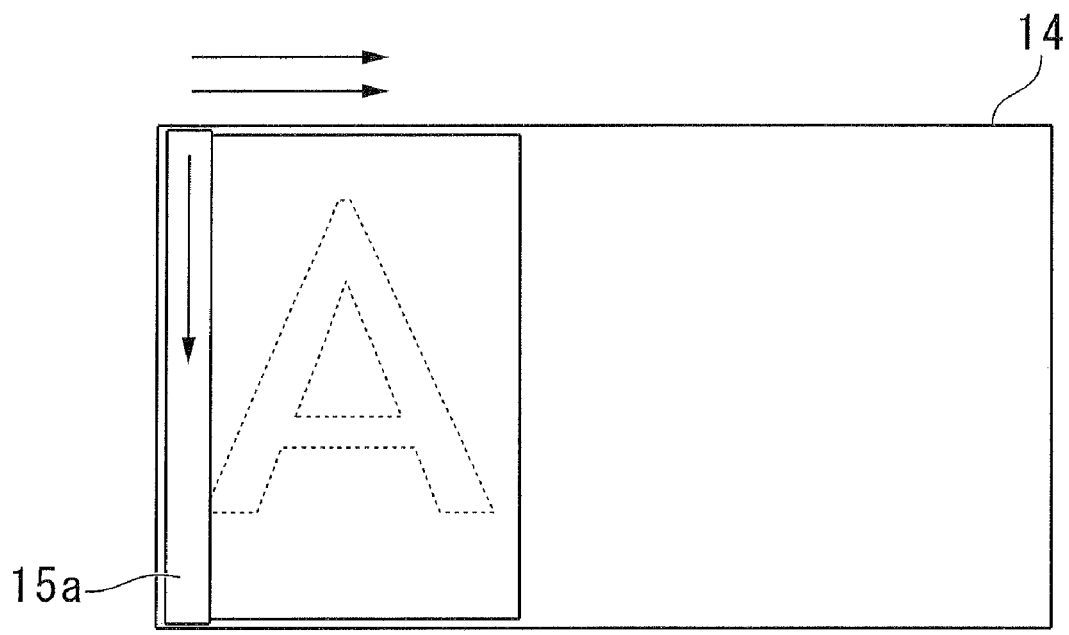
Figure 7B:
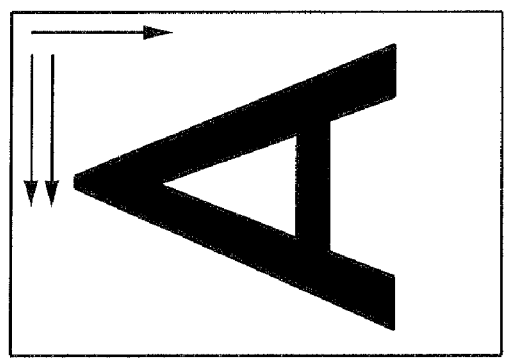

The orientation of the original document and the orientation of the scanned data are described in further detail, with reference to FIG. 7A to FIG. 8B. FIG. 7A shows the case of placing the original document on the table 14 with its top position facing the far side (in the case of "table scanning" in FIG. 6). A scanner 15a performs scanning from top to bottom in a state where the original document is placed as shown in the diagram (shown with the single arrow in FIG. 7A), and the scanner 15a further proceeds with scanning of the entire original document while moving towards the right direction (shown with the double arrow in FIG. 7A). Therefore, the top of the data scanned by the scanner 15a directs the left side as shown in FIG. 7B (corresponds to "the orientation of the top of data is left" in FIG. 6). Here, in FIG. 7A, the top-bottom direction movement of the scanner 15a is the primary scanning direction movement, and the left-right direction movement of the scanner 15a (the direction of the movement of the original document) is the secondary scanning direction movement.

Figure 8A:
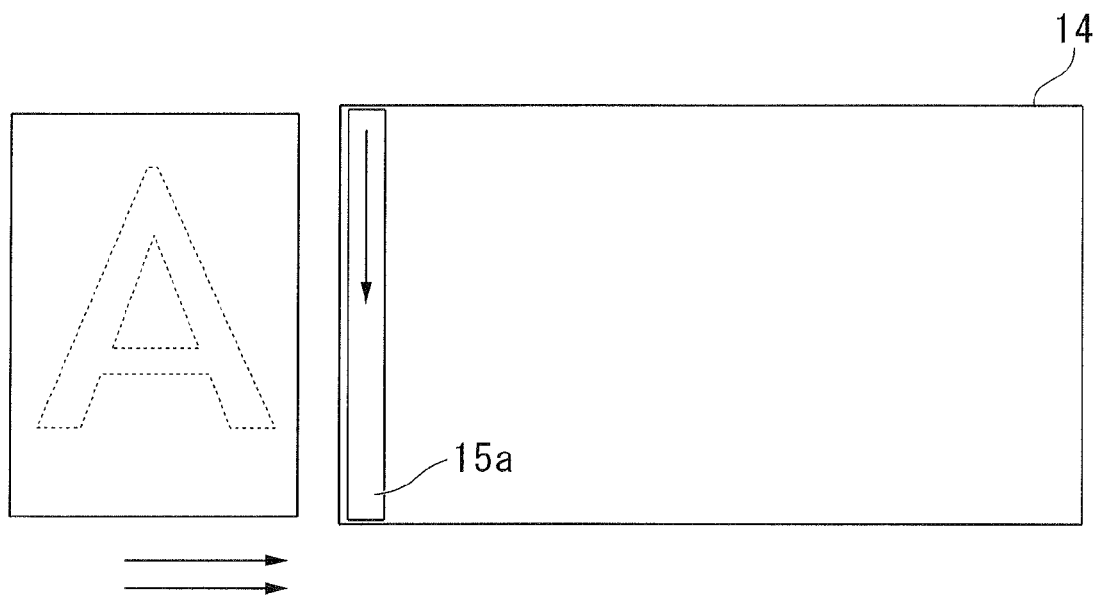
Figure 8B:
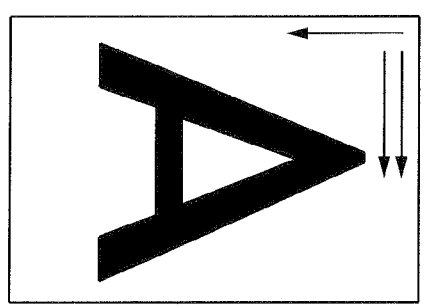

FIG. 8A shows the case of placing the original document on the ADF 13 with its top position facing the far side (in the case of "ADF scanning" in FIG. 6). As shown in this diagram, the original document is transferred to the scanner section 15 while being reversed by the ADF 13. Then, the entire original document is scanned while the original document passes above the scanner 15a (in FIG. 8A, the single arrow shows the scanning direction of the scanner 15a, and the double arrow shows the movement direction of the original document). Therefore, the top of the data scanned by the scanner 15a directs the right side as shown in FIG. 8B (corresponds to "the orientation of the top of data is right" in FIG. 6).

Returning to FIG. 6, in the case of double-side copying, the top position of the original document data is determined according to the method of double-side scanning for the original document. Here, simultaneous double-side scanning is such that in the copying machine 1 provided with the scanner section 15 built into the copying machine main body 3 and the scanner (not shown in the diagram) inside the ADF 13, the front face and the back face of the original document transferred by the ADF 13 is simultaneously scanned by the above mentioned two scanners. On the other hand, alternate double-side scanning is such that in the copying machine 1 provided inside the ADF 13 with the reversing mechanism (not shown in the diagram) for reversing the front face and the back face of the original document, the scanner section 15 built into the copying machine main body 3 sequentially scans the front face and the back face of the original document. Based on which one of the above scanning methods is employed, the top position of the original document data is determined.

Returning to FIG. 4, in step 9, in the control section 33, a print region of the original document is determined based on; the orientation of the top of the scanned original document data, the original document size, the output sheet size, and the print magnification ratio (copy region determining section). At this time, the print region of the original document is determined with reference to the top left corner which can be identified when the original document is placed such that the top position thereof is upward. Based on the orientation of the top of the original document data determined in step 8, a point on the data to which the top left corner of the original document corresponds can be recognized. As a result, the data region (print region) required for printing can be determined according to this point (coordinate). When the print region of the original document has been determined, the flow proceeds to step 10 (S10).

In step 10, scanning of the original document starts in the image scanning section 17. In the case where the original document is set directly on the table 14, the scanner section 15 starts scanning while moving. On the other hand, in the case where the original document is set on the tray of the ADF 13, when the original document is transferred from the tray onto the table 14 sheet by sheet, the scanner section 15 starts scanning from the leading edge of the original document. In this case, the scanner section 15 is not moving but is fixed. When scanning has started, the flow proceeds to step 11 (S11).

In step 11, the scanned data in step 10 of the print region of the original document determined in step 9 is stored in the image storage section 27. Here, from the image data scanned by the scanner section 15, only the data that corresponds to the print region determined in step 9 is stored in the image storage section 27. By configuring as described above, the need for storing ineffectual data into the memory is eliminated. As a result, large quantity copying can be handled. When the scanned data of the original document has been stored into the image storage section 27, the flow proceeds to step 12 (S12).

In step 12, the image processing section 29 appropriately performs image processing such as print magnification ratio change on the scanned data of the original document stored in the image storage section 27. Having performed the above image processing, the flow proceeds to step 13 (S13).

In step 13, the printing section 31 outputs the data that has been image-processed in step 12. That is to say, the corresponding image is printed on the output sheet using a toner built into the copying machine 1. The printed output sheet is discharged from an output sheet discharging section (not shown in the diagram), and then the flow is completed.

FIG. 9A to FIG. 11B show images (right side) printed on output sheets according to the flow chart mentioned above, and images of original documents (left side). In FIG. 9A to FIG. 11B, each of the images is shown so that the top position of the front face of the original document is positioned upward. Furthermore, the original document that has been rotated (reversed) about the axis parallel with the longitudinal direction of the original document is shown as the back face.

Hereinafter, there are described copying results that can be obtained under respective copying conditions shown in FIG. 9A to FIG. 11B where A4 sheets are used for both original documents and outputs sheets and the print magnification ratio is 200%.

(Case of Double-Side to Double-Side Copying)

Figure 9A:
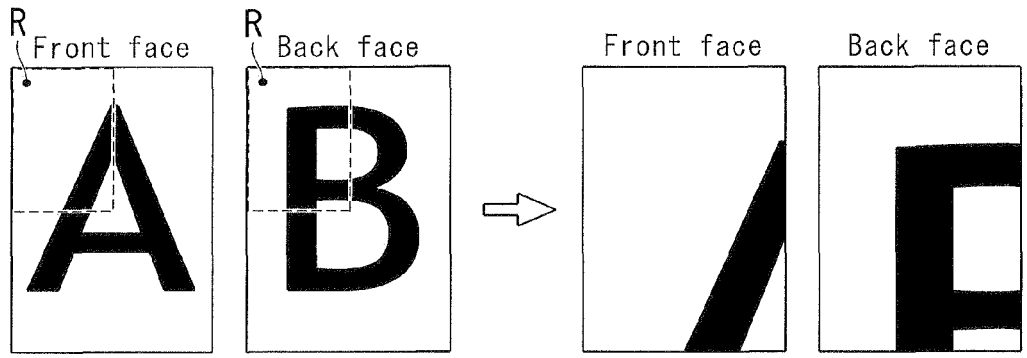
FIG. 9A to FIG. 9D are explanatory diagrams showing relationships between an original document and a printed output sheet in the case of double-side printing the double-sided original document on the output sheet with the copying machine according to the embodiment.

FIG. 9A shows left-right binding original document images, and printed images of the original document that are enlarge-printed in left-right binding on an output sheet. In this case, the top positions of the front face and the back face of the original document are both positioned upward in FIG. 9A. Therefore, both of the ranges (ranges shown with dashed lines) determined with reference to the point R on the top left corner which can be identified when the original document is placed such that the top position thereof is upward, are the top left portions of FIG. 9A. These ranges shown with dashed lines are respectively enlarged and printed on the output sheet as shown on the right side of FIG. 9A. Also in FIG. 9B to FIG. 11B, the point R defined in the same manner (black dot in the diagram) is taken as a reference.

Figure 9B:
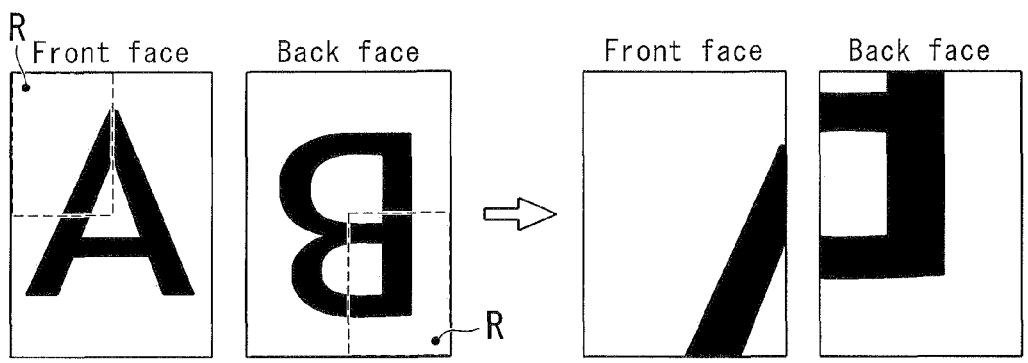

FIG. 9B shows top-bottom binding original document images, and printed images of the original document that are enlarge-printed in top-bottom binding on an output sheet. In this case, the top positions of the front face and the back face of the original document are positioned at 180 degrees from each other as shown in FIG. 9B. Therefore, the ranges (ranges shown with dashed lines) determined with reference to the point R on the top left corner which can be identified when the original document is placed such that the top position thereof is upward, are: the top left portion of FIG. 9B for the front face; and the bottom right portion of FIG. 9B for the back face. These ranges shown with dashed lines are respectively enlarged and printed on the output sheet as shown on the right side of FIG. 9B.

Figure 9C:
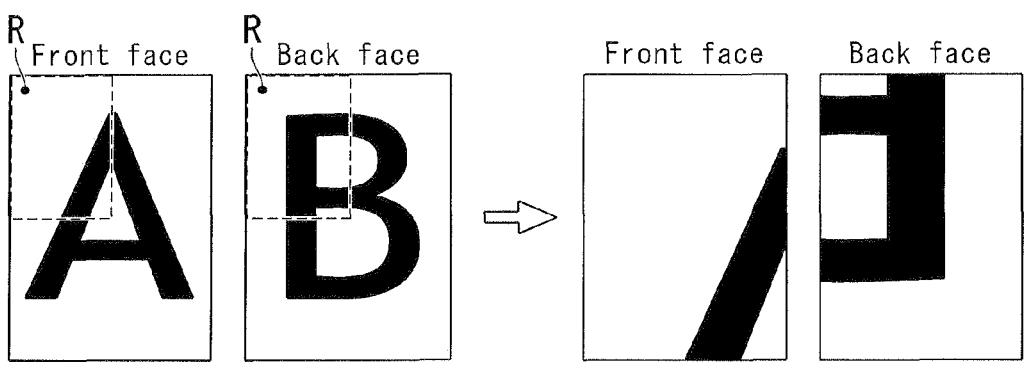

FIG. 9C shows left-right binding original document images, and printed images of the original document that are enlarge-printed in top-bottom binding on an output sheet. In this case, as with the case of FIG. 9A, the copy ranges on both of the front face and the back face are the top left corner portions of FIG. 9C (ranges shown with dashed lines). However, the image within the copy range on the back face is printed on an output sheet so as to be rotated 180 degrees within the plane about the center axis of the original document, so that it is printed in top-bottom binding on the output sheet.

Figure 9D:
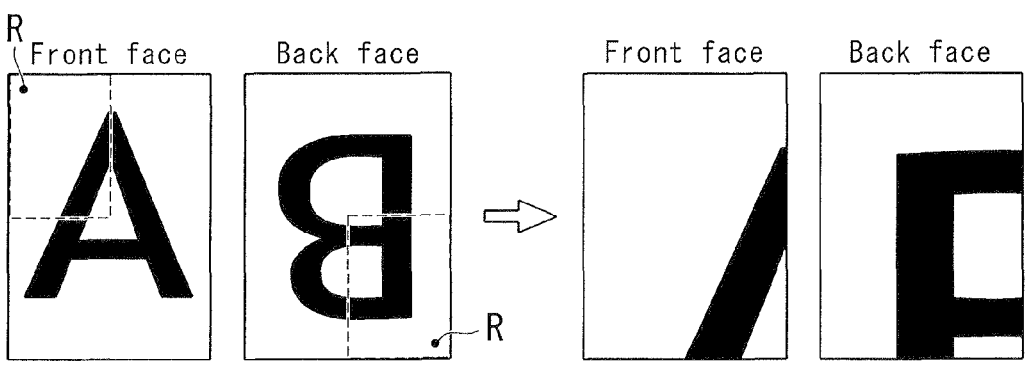

FIG. 9D shows top-bottom binding original document images, and printed images of the original document that are enlarge-printed in left-right binding on an output sheet. In this case, as with the case of FIG. 9B, the copy range of the front face is the top left portion of FIG. 9D and the copy range of the back face is the bottom right portion of the FIG. 9D. However, when printing these copy ranges, as with the case of FIG. 9C mentioned above, the image within the copy range of the back face is printed on an output sheet so as to be rotated 180 degrees within the plane about the center axis of the original document.

(Case of Double-Side to Single-Side Copying)

Figure 10A:
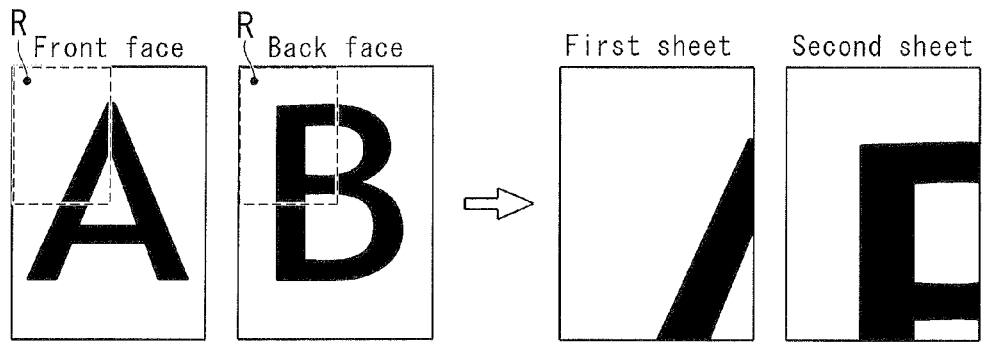
FIG. 10A and FIG. 10B are explanatory diagrams showing relationships between an original document and printed output sheets in the case of single-side printing the double-sided original document on the output sheets with the copying machine according to the embodiment.

FIG. 10A shows left-right binding original document images, and printed images of the original document that are enlarge-printed one side at a time on output sheets. In this case, as with the case of FIG. 9A, the copy ranges on both of the front face and the back face are the top left corner portions of FIG. 10A (ranges shown with dashed lines). The image within the copy range of the front face is printed on the first output sheet, and the image within the copy range of the back face is printed on the second output sheet.

Figure 10B:
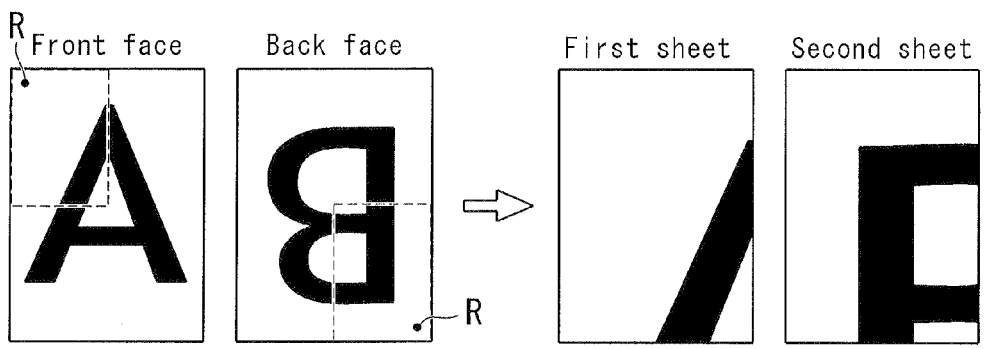

FIG. 10B shows top-bottom binding original document images, and printed images of the original document that are enlarge-printed one side at a time on output sheets. In this case, as with the case of FIG. 9B, the copy range of the front face is the top left portion of FIG. 10B and the copy range of the back face is the bottom right portion of the FIG. 10B. The image within the copy range of the front face is printed on the first output sheet, and the image within the copy range of the back face is printed on the second output sheet. At this time, the back face is rotated 180 degrees within the plane about the center axis of the original document, and the output sheets are discharged so that the top positions of the back face and the top positions of the front face are oriented in the same direction.

(Case of Single-Side to Double-side Copying)

Figure 11A:
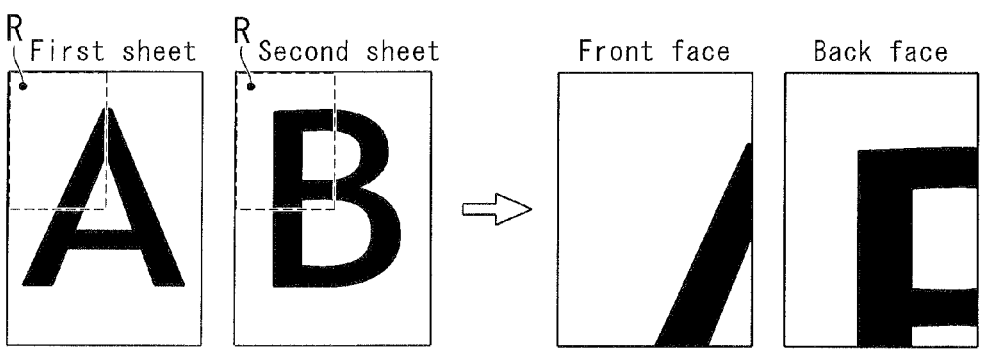
FIG. 11A and FIG. 11B are explanatory diagrams showing relationships between original documents and a printed output sheet, in the case of double-side printing the single-sided original documents on the output sheet with the copying machine according to the embodiment.

FIG. 11A shows images of two single-sided original documents, and printed images of these original documents that are enlarge-printed on both sides of an output sheet in left-right binding. In this case, copy ranges of the first and second original documents shown with dashed lines are determined while taking the point R on the top left corner as a reference when the top positions of the original documents are respectively positioned upward. The image within the copy range of the first original document is printed on the front face of the output sheet, and the image within the copy range of the second original document is printed on the back face of the output sheet.

Figure 11B:
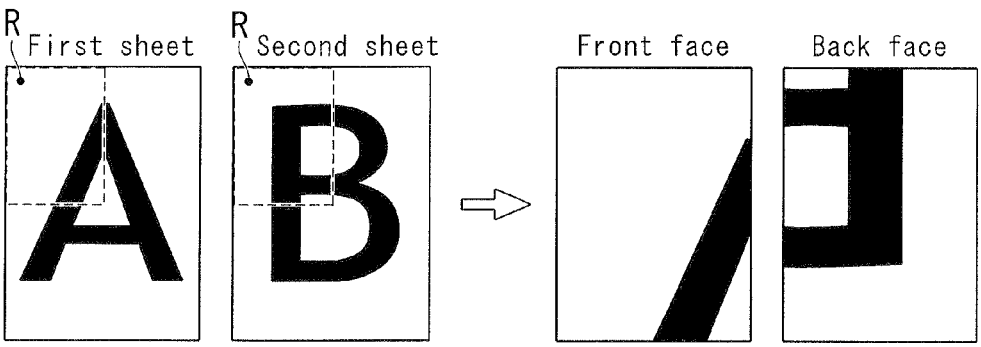

FIG. 11B shows images of two single-sided original documents, and printed images of these original documents that are enlarge-printed on both sides of an output sheet in top-bottom binding. In this case, as with the case of FIG. 11A, copy ranges of the first and second original documents shown with dashed lines are respectively determined while taking the point R on the top left corner as a reference. The image within the copy range of the first original document is printed on the front face of the output sheet, and the image within the copy range of the second original document is printed on the back face of the output sheet. At this time, in order to have printing done on the output sheet in top-bottom binding, the image of the copy range of the second original document is printed on the back face of the output sheet so as to be rotated 180 degrees within the plane about the center axis of the original document.

By having the configuration as described above, the range with a reference of the same position of the original document (top left corner which can be identified when the original document is placed such that the top position thereof is upward) can always be copied. Similarly, even if the direction of original document placement (top position) is different from that in FIG. 9A to FIG. 11B (the orientation of the original documents in FIG. 9A to FIG. 11B is far side facing; however, even if the orientation is left side facing), the original document can be copied in the same manner as long as the top position setting section correctly sets the top position of the original document.

According to the present embodiment, the copying machine 1 having the double-side copying function includes: the original document detection section that detects the size of an original document and the original document size setting section that sets the size of the original document; the original document top position setting section that sets the top position of the original document as required; the binding direction setting section that sets the binding direction of the original document and the binding direction of output sheets as required; the output size setting section that sets the output sheet size as required; the print magnification ratio setting section that sets the print magnification ratio as required; and the copy region determination section that determines the copy region of the original document based on conditions set by the above respective setting sections. Thereby the copy region can be determined while taking the top left corner of the original document as a reference when the top position of the original document is positioned upward.

More specifically, what range of the original document is to be copied on an output sheet can be determined by the respective setting sections and the range to be copied is scanned while taking the top left corner of the original document sheet as a reference. As a result, how copying is going to result on an output sheet can be easily estimated by the user. In other words, when copying the original document, a copy result that reflects the user's intention can be easily obtained.

Furthermore, the copying machine 1 is capable of: storing only the data within a range corresponding to the copy region from the data of the original document scanned by the scanner 15a, into the image storage section 27; performing processing such as enlargement and reduction in the image processing section 29 based on the stored data; and printing on output sheets in the printing section 31 and discharging them. Therefore, the copying function described above can be realized without a need for increasing the capacity of a memory such as RAM for temporarily storing the scanned data of the scanner 15a. As a result, the copying function described above can be realized without increasing the manufacturing cost for the copying machine 1.

The technical scope of the present invention is not to be considered as being limited to the embodiment described above, and various modifications may be allowed without departing from the spirit or scope of the invention. The specific method illustrated in the present embodiment is merely an example, and it may be appropriately modified.

For example, the order of the respective settings may be interchanged (e.g., original document setting, output sheet size setting, and print magnification ratio setting) as long as the copying function is correctly performed.

Next, a second embodiment of the present invention will be described, with reference to FIG. 12 to FIG. 23B. In the present embodiment, there is described a case of employing the image forming apparatus of the present invention in a multi-function machine having a plurality of functions including a copying function, a printer function, a fax function, and a scanner function.

Figure 12:
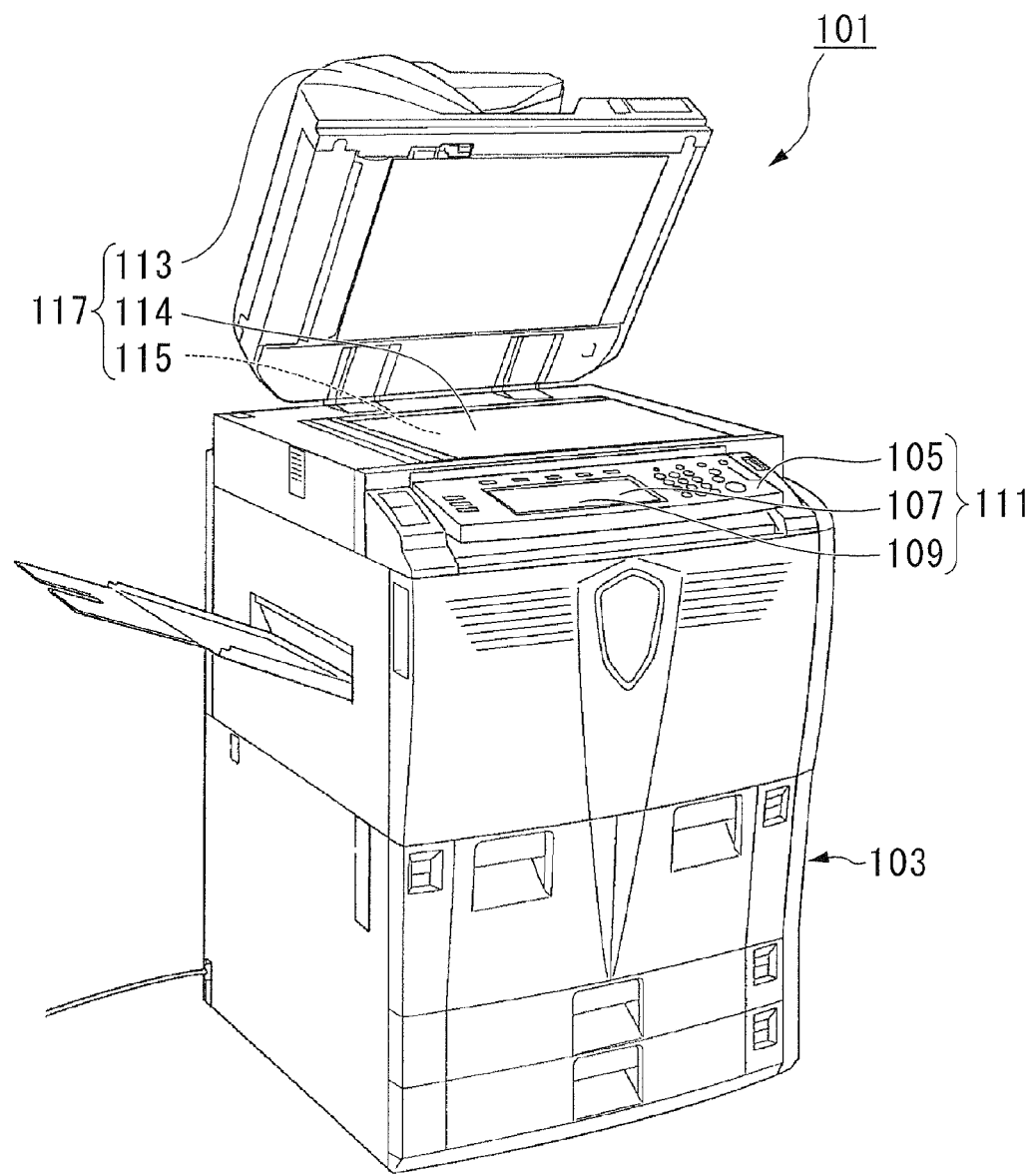
FIG. 12 is a perspective view of a multi-function machine according to a second embodiment of the present invention.

As shown in FIG. 12, a multi-function machine 101 is provided in the bottom part thereof with a multi-function machine main body 103 having an image storage section, an image processing section, a printing section, a control section, and so forth not shown in the diagram. On the top section front side of the multi-function machine 101, there is provided an operation display device 111 having an operation section 105 for executing various kinds of operations of the multi-function machine 101, and a display section 109 on the entire surface of which a touch panel 107 formed with a transparent electrode is arranged. In addition, on the top section of the multi-function machine 101, there is provided an image scanning section 117 having an automatic document feeding device (ADF) 113 for automatically feeding original documents, a table 114 formed with a transparent glass on which an original document is to be placed, and a scanner section 115 for scanning the original document. The multi-function machine 101 has functions of a copier, a printer, a fax, and a scanner.

Figure 13:
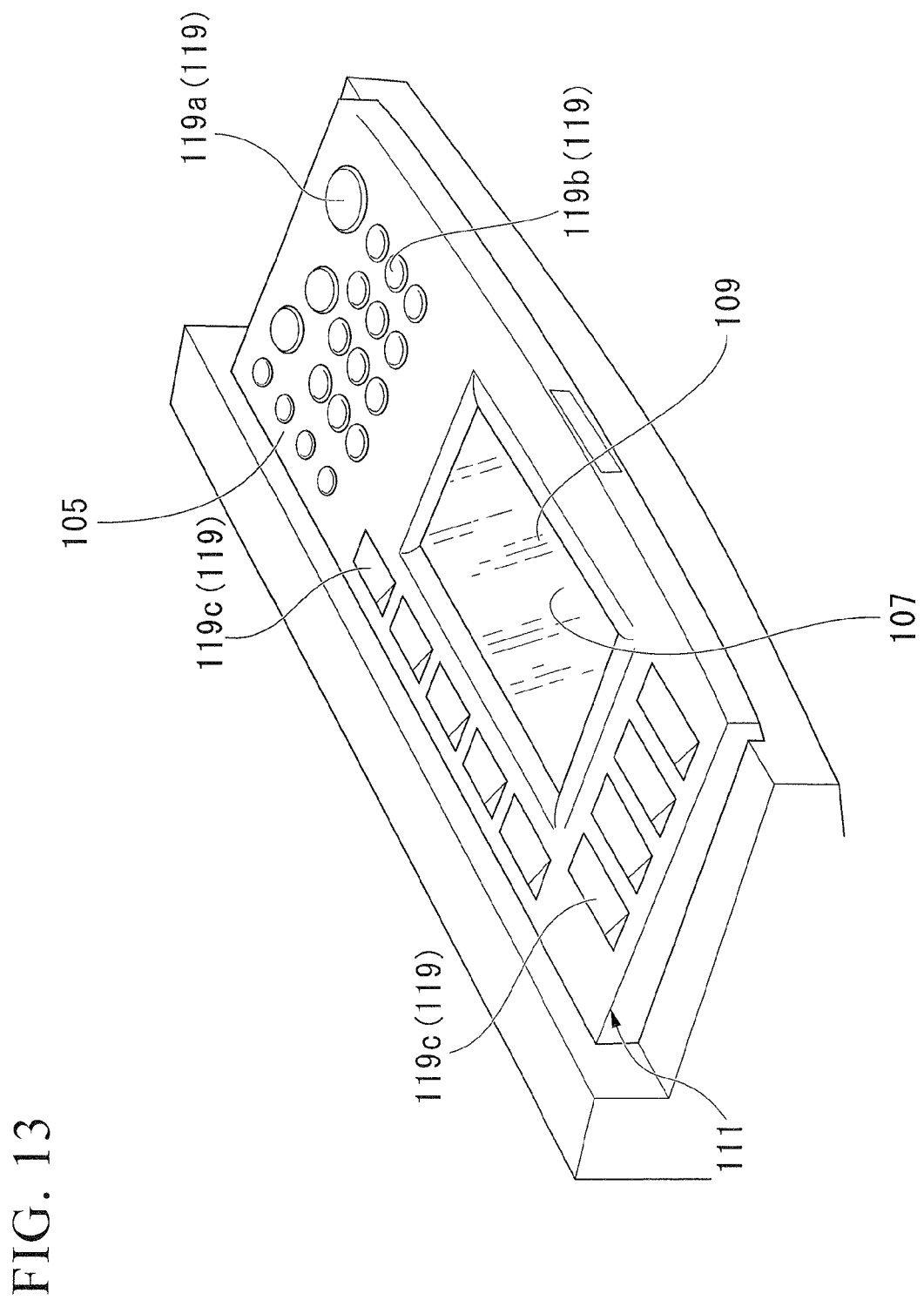
FIG. 13 is a perspective view of an operation display device according to the embodiment.

As shown in FIG. 13, the operation display device 111 is configured with the operation section 105 and the display section 109.

The operation section 105 is provided with a plurality of buttons 119 for receiving various kinds of operation instructions from a user and for outputting the contents of operation instructions to a control section 133. The buttons 119 include: a start key 119a for starting a copying operation or a fax transmission operation; numeric keys 119b for setting the number of copies to be made or setting telephone numbers for faxing; and function keys 119c for starting an initial setting screen.

Moreover, the display section 109 is configured with a color or monochrome liquid crystal display (LCD), and it displays various kinds of information in forms of various kinds of images, characters and figures, based on display instructions inputted from the control section 133 described later. Furthermore, the touch panel 7 functions with user's touch on the respective function keys displayed on the display section 109. The content of instructions inputted on the touch panel 107 is outputted to the control section 133.

Figure 14:
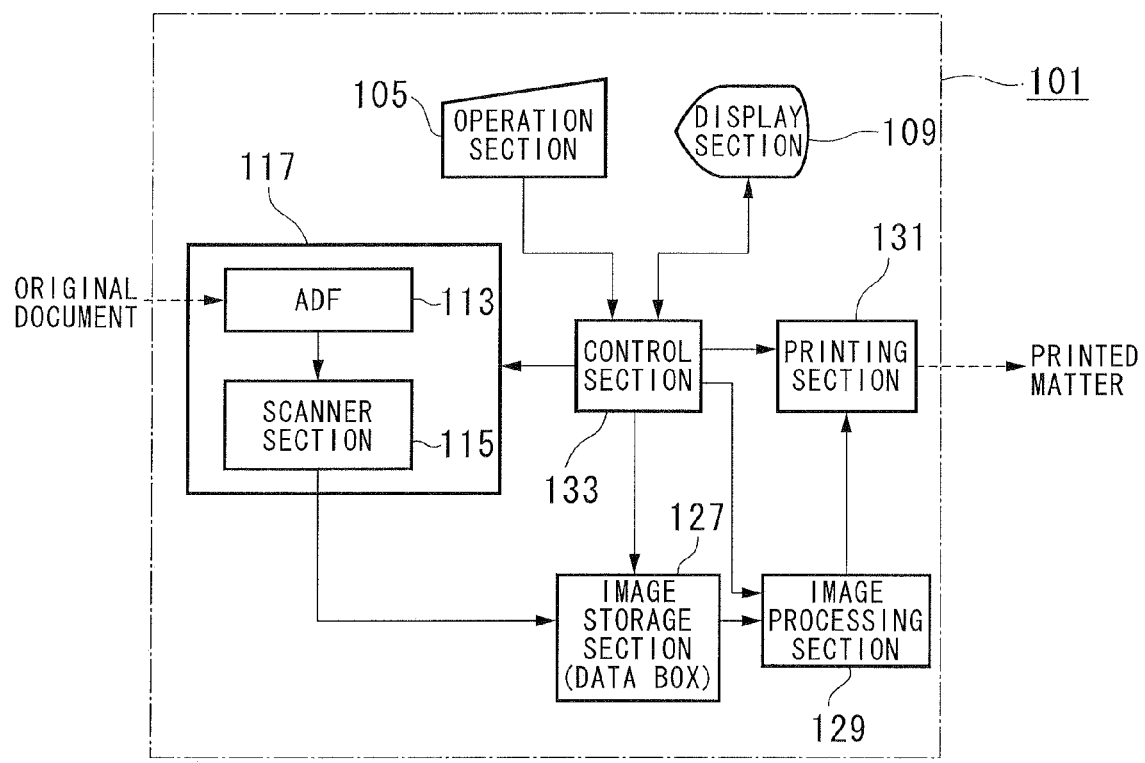
FIG. 14 is a block diagram of a multi-function machine according to the embodiment.

FIG. 14 shows a block diagram of the multi-function machine 101. As shown in this diagram, the functional aspect of the multi-function machine 101 is configured essentially with the operation section 105, the display section 109, the image scanning section 117, an image storage section 127, an image processing section 129, a printing section 131, the control section 133, and the like. Since the operation section 105 and the display section 109 are communicably connected to the control section 133 as mentioned above, transmission and reception of signals that correspond to the various kinds of operations for a plurality of functions can be performed.

The image scanning section 117 is provided with the automatic document feeding device (ADF) 113 and the scanner section 115 built into the multi-function machine main body 103. In the image scanning section 117, under the control of the control section 133, the scanner section 115 sequentially scans the image of an original document while the original document supplied from the automatic document feeding device 113 is being transferred onto the table 114. The scanned original document image is outputted to the image storage section 127 as color image data. Moreover, also in the case of where the original document is placed directly on the table 114, the image of the original document is scanned by the scanner section 115.

Furthermore, in order to scan both sides of an original document, the multi-function machine 101 is provided inside the ADF 113 with a scanner or a reversing mechanism for reversing the front side and the back side of the original document.

The image storage section 127 is configured essentially with an external storage device such as a hard disk drive, and/or with a semiconductor memory, and it stores the color image data of the original document inputted from the image scanning section 117. This image storage section 127, under the control of the control section 133, performs writing of the color image data of the scanned original document, and it reads the color image data and outputs it to the image processing section 129.

The image processing section 129, under the control of the control section 133, converts the color image data inputted from the image storage section 127 into data for printing and outputs it to the printing section 131.

The printing section 131, under the control of the control section 133, transfers a printing sheet while attaching toners thereon, thereby outputting the original document image on the printing sheet based on the above color image data (printing section).

The control section 133 controls the overall behavior of the multi-function machine 101 based on operation instructions inputted from the operation section 105 or the touch panel 107 of the display section 109, a control program stored in a built-in memory, and various kinds of control data. To perform the above-described control, the control section 133 is configured essentially with: a CPU (central processing unit) that performs control calculations based on the operation instructions, the control program and various kinds of control data, and with various kinds of input/output interface circuits that perform data communication with the respective other sections (e.g., the operation section 105, the display section 109, the image scanning section 117, the image storage section 127, the image processing section 129, and the printing section 131). By performing overall control of the respective other sections mentioned above, the control section 133 is able to perform: printing of the original document image that has been scanned by the image scanning section 117 in the printing section 131, using its copying function and scanner function; printing as a printer of externally received original document data; and printing of received fax data.

Here, in the multi-function machine 101 there is provided a data box into which original document data scanned by the scanner, and data stored on a personal computer connected via LAN or the like can be stored. The data box is configured essentially with a hard disk drive and is capable of storing a plurality of data. Moreover, in the multi-function machine 101, it is possible to read data stored in the data box, and output required data from the printing section 131. The data box also serves as the image storage section 127.

Next, the flow of operations for storing original document data into the data box with use of the multi-function machine 101 will be described, with reference to the flow chart in FIG. 15.

Figure 15:
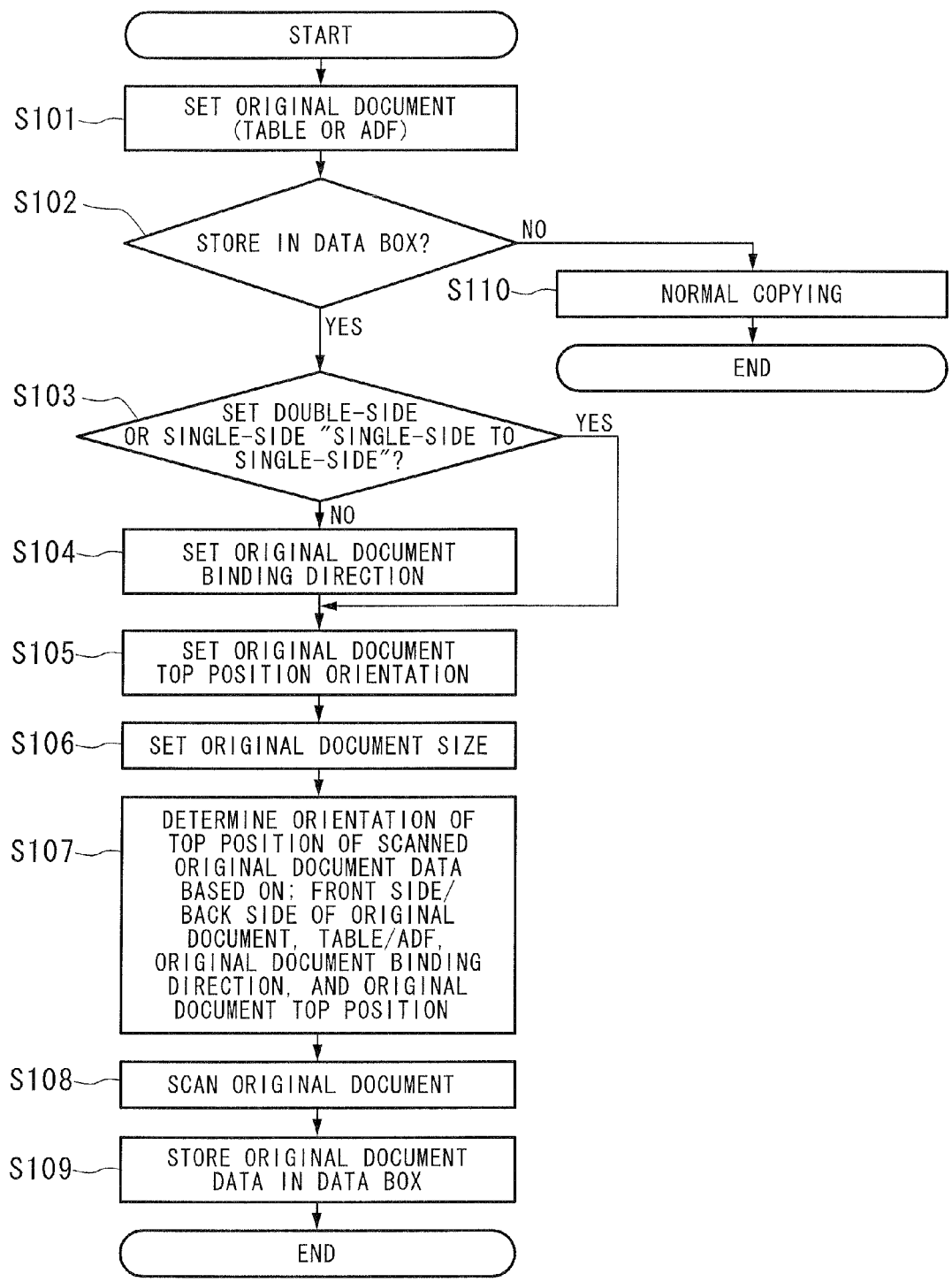
FIG. 15 is a flow chart showing the flow of operations according to the embodiment performed when storing original document data into a data box.

As shown in FIG. 15, in step 100 (S100), a sensor (not shown in the diagram) detects whether or not an original document has been set on the tray of the ADF 113 or whether or not the original document has been set directly on the table 114. When an original document has been set on either of the above, the flow proceeds to step 102 (S102).

In step 102, it is set whether or not original document data is to be stored into the data box. The data box is normally set not to store data. Therefore, in the case of storing data, it is accordingly selected using functions keys displayed on the display section 109. If it has been set to store data, the flow proceeds to step 103 (S103). If it has been set not to store data, the flow proceeds to step 110 (S110), and in this step, the original document is scanned by the scanner and copying is performed normally without storing data.

In step 103, whether the original document is double-sided or single-sided is set. Since it is normally set to "single-sided", when "double-sided" needs to be selected, it is selected with the function keys displayed on the display section 109. Here, if "double-sided" is selected, then the flow proceeds to step 104 (S104), and if "single-sided" is selected, then the flow proceeds to step 105 (S105).

In step 104, the binding direction of the original document is set (binding direction setting section). The options of binding directions are "left-right binding" and "top-bottom binding", and either one of these is selected. When the binding direction has been set, the flow proceeds to step 105.

Figure 16:
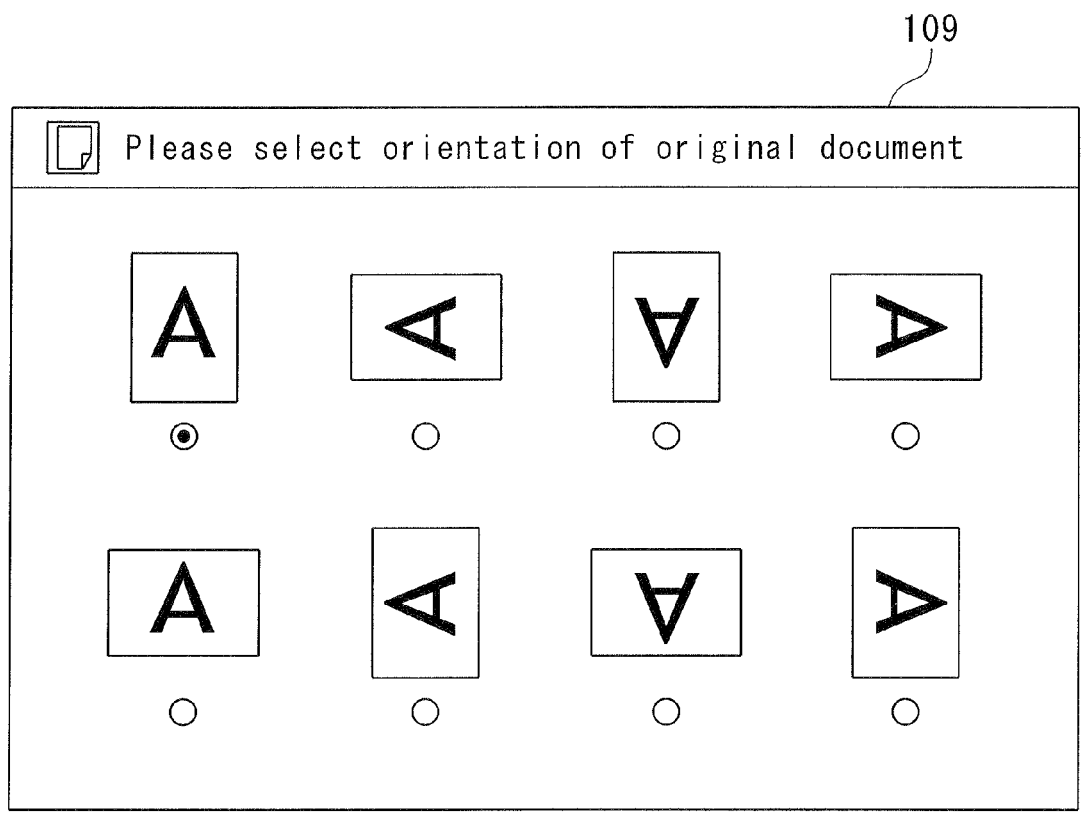
FIG. 16 is an explanatory diagram showing a display section when setting the top position of an original document according to the embodiment.

In step 105, the orientation of the top position of the original document is set (original document top position setting section). Here, the top position of the original document refers to the position of the top part of the original document which is defined according to the orientation of characters and images on the original document. As shown in FIG. 16, the orientation of the original document is selected from eight patterns displayed on the display section 109. In the case where the original document is set on the tray of the ADF 113, the orientation of the original document when placed on the tray with the front face (odd number original document) up is selected. On the other hand, in the case where the original document is set on the table 114, the orientation of the original document when placed such that the front face faces the scanner section 115 is selected. When the top position of the original document has been set, the flow proceeds to step 106 (S106).

Returning to FIG. 15, in step 106, the size of the original document is determined. The size of the original document is determined either; by automatically detecting the size with a sensor which is provided in the multi-function machine 101 and is not shown in the diagram (original document detection section), or by manually setting the size on the display section 109 (original document size setting section). In particular, in the case where the size of the original document is irregular and the size cannot be accurately recognized through automatic detection, the original document size can be determined by performing manual setting. When the size of the original document has been set, the flow proceeds to step 107 (S107).

In step 107, the orientation of the top of the scanned original document data is determined in the control section 133 based on; the front side/back side (odd number page or even number page) of the original document, the position in which the original document is set (table 114 or ADF 113), the binding direction of the original document, the top position, and the size of the original document. The term "orientation of the top of the original document data" as used herein refers to an orientation of the top of an original document data scanned by the scanner section 115. When the orientation of the top of the scanned original document data has been set, the flow proceeds to step 108 (S108).

Figure 17:
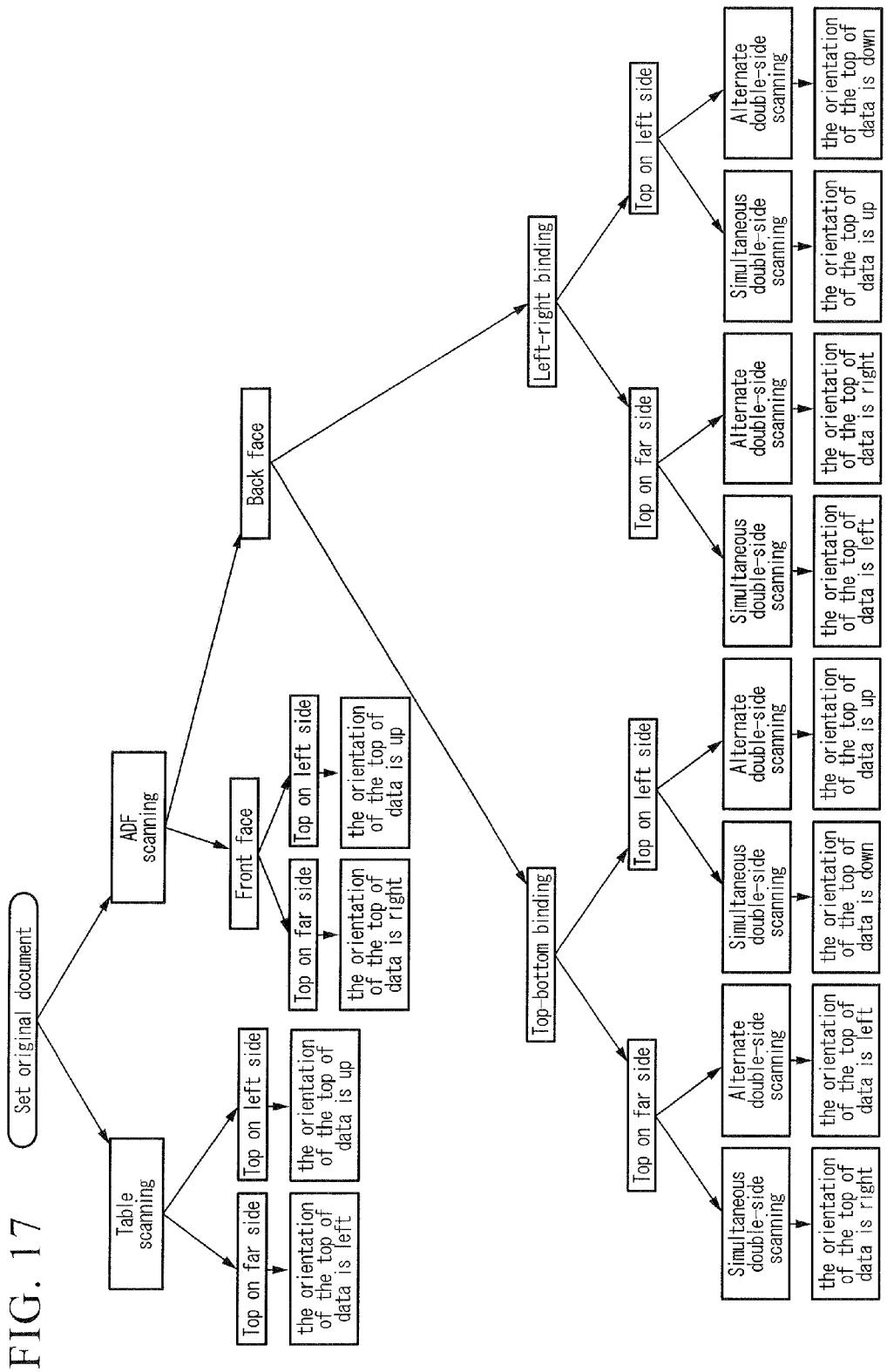
FIG. 17 is an explanatory diagram showing the flow of determining the orientation of the top of scanned original document data in the multi-function machine according to the embodiment.

The above orientation of the top of the original document data is respectively determined according to various kinds of conditions as shown in FIG. 17. In FIG. 17, only the case where the top of the original document directs the far side (the top position of the original document is positioned on the side furthest from the user) or where it directs the left side (the top position of the original document is positioned on the left side of the user) is described. This is because often original documents are mainly placed in the far side facing orientation or in the left side facing orientation. Also in the case where the original document is placed with its top position facing the near side or the right side when seen from the user, the orientation of the top of the original document data can be determined.

Figure 18A:
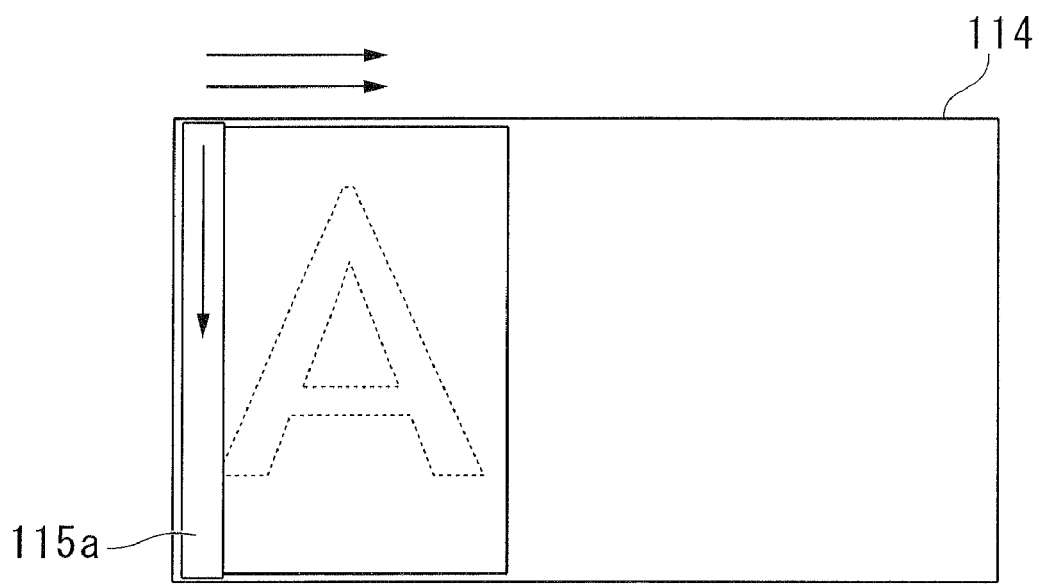
Figure 18B:
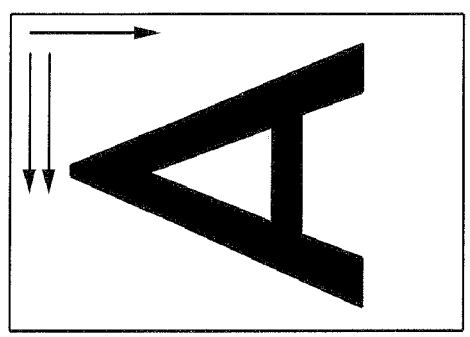

The orientation of the original document and the orientation of the scanned data are described in further detail, with reference to FIG. 18A to FIG. 19B. FIG. 18A shows the case of placing the original document on the table 114 with its top position facing the far side (in the case of "table scanning" in FIG. 17). A scanner 115a performs scanning from top to bottom in a state where the original document is placed as shown in the diagram (shown with the single arrow in FIG. 18A), and the scanner 115a further proceeds with scanning of the entire original document while moving towards the right direction (shown with the double arrow in FIG. 18A). Therefore, the top of the data scanned by the scanner 115a directs the left side as shown in FIG. 18B (corresponds to "the orientation of the top of data is left" in FIG. 17). Here, in FIG. 18A, the top-bottom direction movement of the scanner 115a is the primary scanning direction movement, and the left-right direction movement of the scanner 115a (the direction of the movement of the original document) is the secondary scanning direction movement.

Figure 19A:
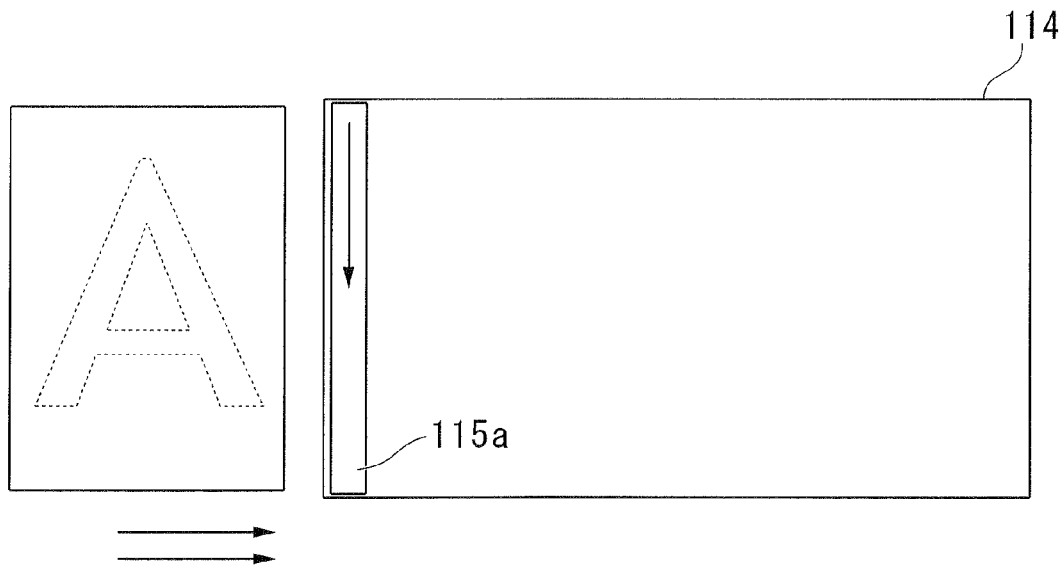
Figure 19B:
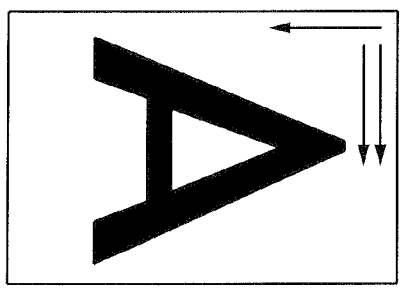

FIG. 19A shows the case of placing the original document on the ADF 113 with its top position facing the far side (in the case of "ADF scanning" in FIG. 17). As shown in this diagram, the original document is transferred to the scanner section 115 while being reversed by the ADF 113. Then, the entire original document is scanned while the original document passes above the scanner 115a (in FIG. 19A, the single arrow shows the scanning direction of the scanner 115a, and the double arrow shows the movement direction of the original document). Therefore, the top of the data scanned by the scanner 115a directs the right side as shown in FIG. 19B (corresponds to "the orientation of the top of data is right" in FIG. 17).

Returning to FIG. 17, in the case of double-side copying, the top position of the original document data is determined according to the method of double-side scanning for the original document. Here, simultaneous double-side scanning is such that in the multi-function machine 101 provided with the scanner section 115 built into the multi-function machine main body 103 and the scanner (not shown in the diagram) inside the ADF 113, the front face and the back face of the original document transferred by the ADF 13 is simultaneously scanned by the above mentioned two scanners. On the other hand, alternate double-side scanning is such that in the multi-function machine 101 provided inside the ADF 113 with the reversing mechanism (not shown in the diagram) for reversing the front face and the back face of the original document, the scanner section 115 built into the multi-function machine main body 103 sequentially scans the front face and the back face of the original document. Based on which one of the above scanning methods is employed, the top position of the original document data is determined.

In step 108, by pressing down the start key 119a, the scanner section 115 starts scanning of the original document. When the scanning of the original document is entirely completed, the flow proceeds to step 109 (S109).

In step 109, the original document data scanned in step 108 is stored into the data box. All of scanned data is stored into the data box. At this time, the scanned original document data is stored with added its top orientation information.

Next, the case of outputting the data stored in the data box onto an output sheet with use of the multi-function machine 101 will be described, with reference to the flow chart in FIG. 20.

Figure 20:
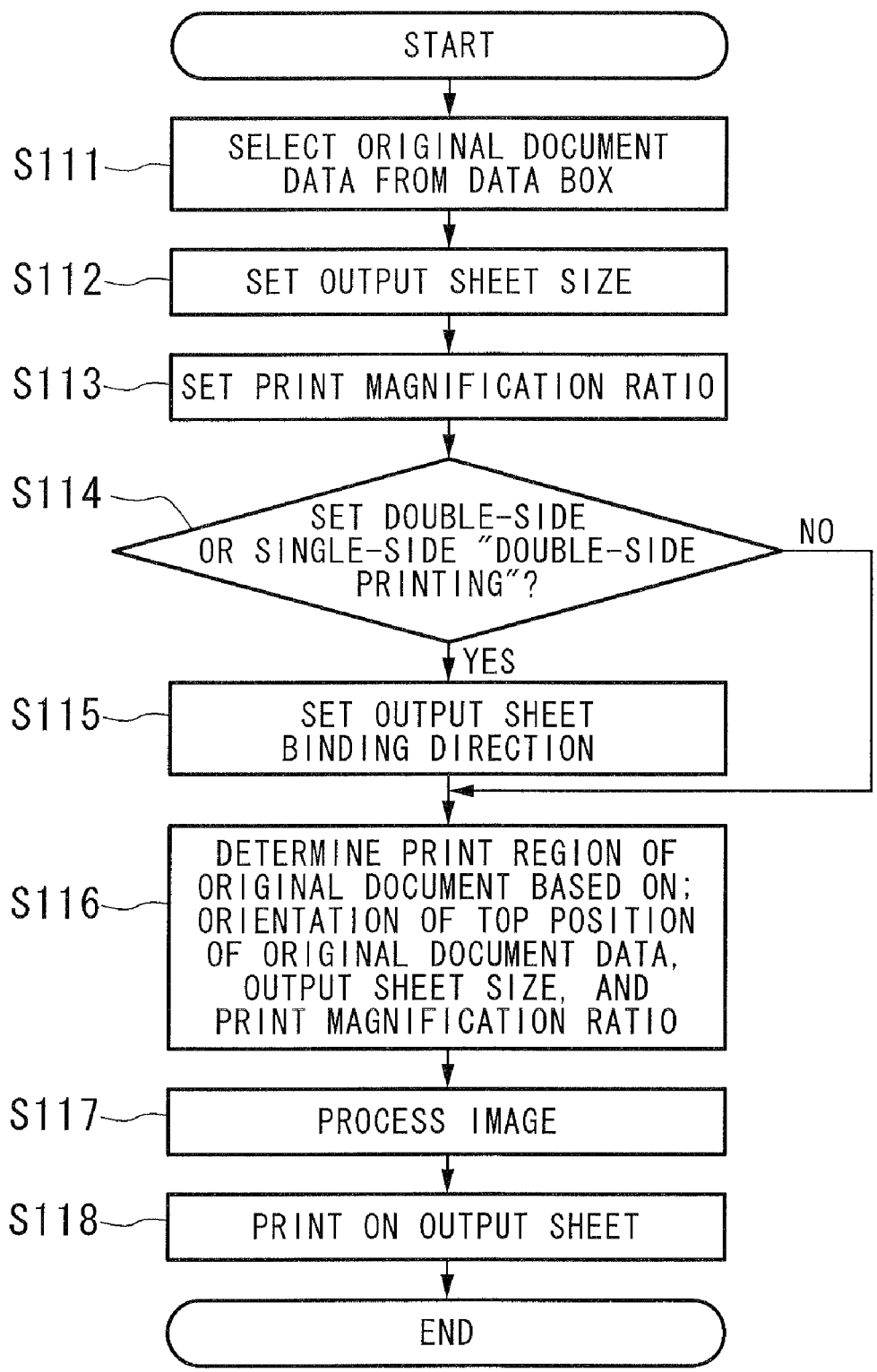
FIG. 20 is a flow chart showing the flow of operations according to the embodiment performed when printing the original document data stored in the data box.

As shown in FIG. 20, in step 111 (S111), the data that needs to be outputted is selected from the data box. At this time, in the data box, there are stored original document data scanned in the above described procedures and original document data transmitted from a personal computer (PC) connected via LAN. The required data can be selected from these data. When the data has been selected, the flow proceeds to step 112 (S112).

In step 112, the size of the output sheet is determined (output size setting section). By operating the display section 109, the size of the sheet on which printing is to be outputted (printed) is determined. When the size of the output sheet has been determined, the flow proceeds to step 113 (S113).

In step 113, a print magnification ratio for the output sheet is set (print magnification ratio setting section). By operating the display section 109, the percentage of the print size compared to the original document print size is set. When the print magnification ratio has been set, the flow proceeds to step 114 (S114).

In step 114, whether printing is to be performed on a single side of an output sheet or printing is to be performed on both sides of the output sheet is set. Specifically, in the display section 109, whether to perform "single-side printing" or "double-side printing" is selected. If it is set to "single-side printing", the flow proceeds to step 116 (S116), and if it is set to "double-side printing", the flow proceeds to step 115 (S115).

In step 115, the binding direction of the output sheet is set. The options of binding directions are "left-right binding" and "top-bottom binding", and either one of these is selected. When the binding direction has been set, the flow proceeds to step 116.

In step 116, in the control section 133, the print region (output region) of the original document is determined based on; the orientation of the top of the scanned original document data, the original document size, the output sheet size, and the print magnification ratio (print region determining section). At this time, the print region of the original document is determined with reference to the top left corner which can be identified when the original document is placed such that the top position thereof is upward. Here, since the top orientation information of the original document data has already been stored in the data box according to the flow chart shown in FIG. 15, a point on the data to which the top left corner of the original document corresponds can be recognized. Therefore, the data region (print region) required for printing can be determined based on the point (coordinate). When the print region of the original document has been determined, the operation proceeds to step 117 (S117). Note that the data stored via LAN can be similarly handled by storing it into the data box after it has been pre-adjusted on a PC so that the top position of the original data is positioned upward.

In step 117, data of the region corresponding to the print region is extracted from the original document data stored in the data box, and the image flow section 129 appropriately performs image processing such as changing the print magnification ratio for the data. Having performed the above image processing, the flow proceeds to step 118 (S118).

In step 118, the printing section 131 outputs the data that has been image-processed in step 117. That is to say, the corresponding image is printed on an output sheet using the toner built into the multi-function machine 101. The printed output sheet is discharged from an output sheet discharging section (not shown in the diagram), and then the processing is completed.

FIG. 21A to FIG. 23B show images (right side) printed on output sheets according to the flow chart mentioned above, and images of original documents (left side). In FIG. 21A to FIG. 23B, each of the images is shown so that the top position of the front face of the original document is positioned upward. Furthermore, the original document that has been rotated (reversed) about the axis parallel with the longitudinal direction of the original document is shown as the back face.

Hereinafter, there are described printing results that can be obtained under respective printing conditions shown in FIG. 21A to FIG. 23B where A4 sheets are used for both original documents and outputs sheets and the print magnification ratio is 200%.

(Case of Double-Side to Double-Side Printing)

Figure 21A:
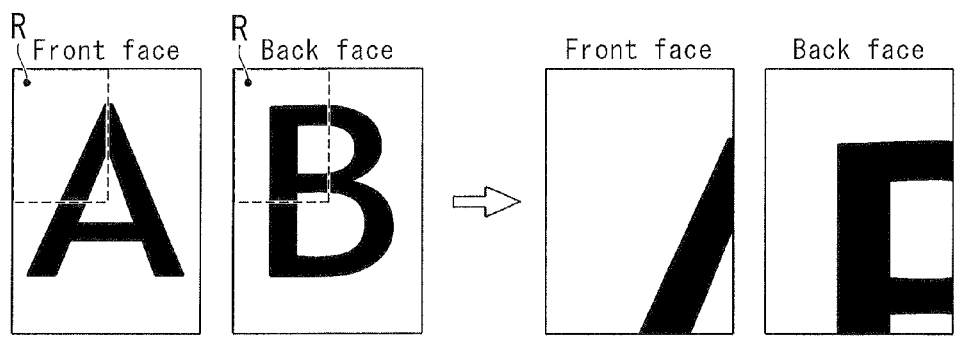
FIG. 21A to FIG. 21D are explanatory diagrams showing relationships between an original document and a printed output sheet in the case of double-side printing the double-sided original document on the output sheet with the multi-function machine according to the embodiment.

FIG. 21A shows left-right binding original document images, and printed images of the original document that are enlarge-printed in left-right binding on an output sheet. In this case, the top positions of the front face and the back face of the original document are both positioned upward in FIG. 21A. Therefore, both of the print ranges (ranges shown with dashed lines) determined with reference to the point R on the top left corner which can be identified when the original document is placed such that the top position thereof is upward, are the top left portions of FIG. 21A. These ranges shown with dashed lines are respectively enlarged and printed on the output sheet as shown on the right side of FIG. 21B. Also in FIG. 21B to FIG. 23B, the point R defined in the same manner (black dot in the diagram) is taken as a reference.

Figure 21B:
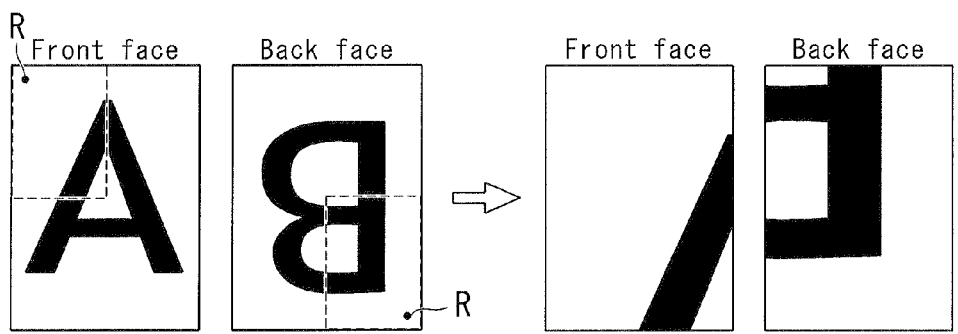

FIG. 21B shows top-bottom binding original document images, and printed images of the original document that are enlarge-printed in top-bottom binding on an output sheet. In this case, the top positions of the front face and the back face of the original document are positioned at 180 degrees from each other as shown in FIG. 21B. Therefore, the print ranges (ranges shown with dashed lines) determined with reference to the point R on the top left corner which can be identified when the original document is placed such that the top position thereof is upward, are: the top left portion of FIG. 21B for the front face; and the bottom right portion of FIG. 21B for the back face. These ranges shown with dashed lines are respectively enlarged and printed on the output sheet as shown on the right side of FIG. 21B.

Figure 21C:
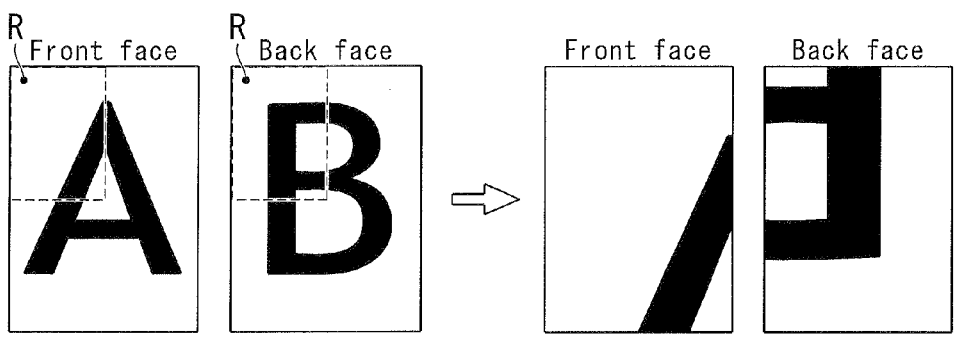

FIG. 21C shows left-right binding original document images, and printed images of the original document that are enlarge-printed in top-bottom binding on an output sheet. In this case, as with the case of FIG. 21A, the print ranges on both of the front face and the back face are the top left corner portions of FIG. 21C (ranges shown with dashed lines). However, the image within the print range on the back face is printed on an output sheet so as to be rotated 180 degrees within the plane about the center axis of the original document, so that it is printed in top-bottom binding on the output sheet.

Figure 21D:
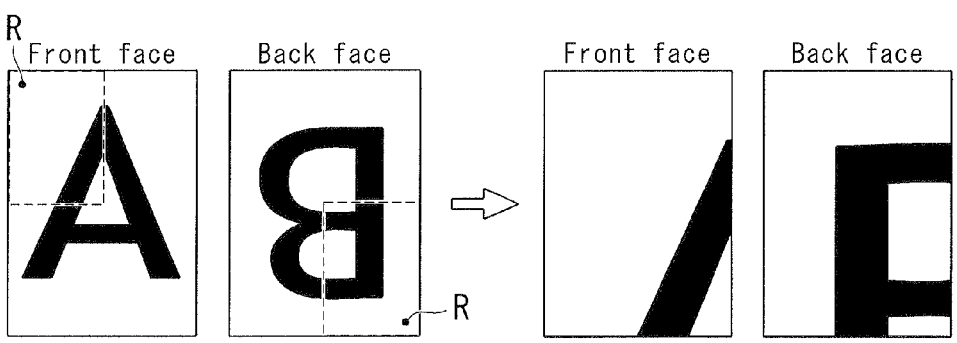

FIG. 21D shows top-bottom binding original document images, and printed images of the original document that are enlarge-printed in left-right binding on an output sheet. In this case, as with the case of FIG. 21B, the print range of the front face is the top left portion of FIG. 21D and the print range of the back face is the bottom right portion of the FIG. 21D. However, when printing these print ranges, as with the case of FIG. 21C mentioned above, the image within the print range of the back face is printed on an output sheet so as to be rotated 180 degrees within the plane about the center axis of the original document.

(Case of Double-Side to Single-Side Printing)

Figure 22A:
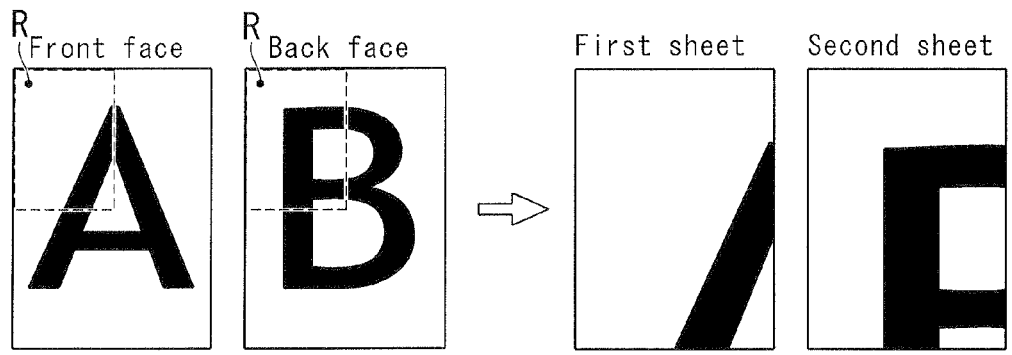
FIG. 22A and FIG. 22B are explanatory diagrams showing relationships between an original document and printed output sheets, in the case of single-side printing the double-sided original document on the output sheets with the multi-function machine according to the embodiment.

FIG. 22A shows left-right binding original document images, and printed images of the original document that are enlarge-printed one side at a time on output sheets. In this case, as with the case of FIG. 21A, the print ranges on both of the front face and the back face are the top left corner portions of FIG. 22A (ranges shown with dashed lines). The image within the print range of the front face is printed on the first output sheet, and the image within the print range of the back face is printed on the second output sheet.

Figure 22B:
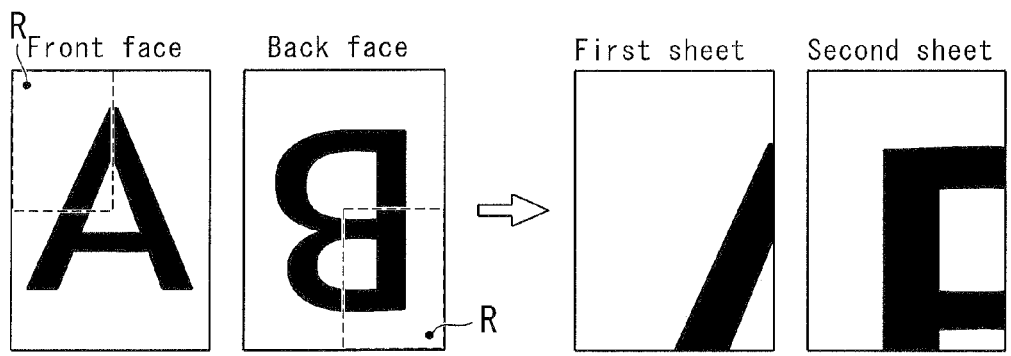

FIG. 22B shows top-bottom binding original document images, and printed images of the original document that are enlarge-printed one side at a time on output sheets. In this case, as with the case of FIG. 21B, the print range of the front face is the top left portion of FIG. 22B and the print range of the back face is the bottom right portion of the FIG. 22B. The image within the print range of the front face is printed on the first output sheet, and the image within the print range of the back face is printed on the second output sheet. At this time, the back face is rotated 180 degrees within the plane about the center axis of the original document, and the output sheets are discharged so that the top positions of the back face and the top positions of the front face are oriented in the same direction.

(Case of Single-Side to Double-Side Printing)

Figure 23A:
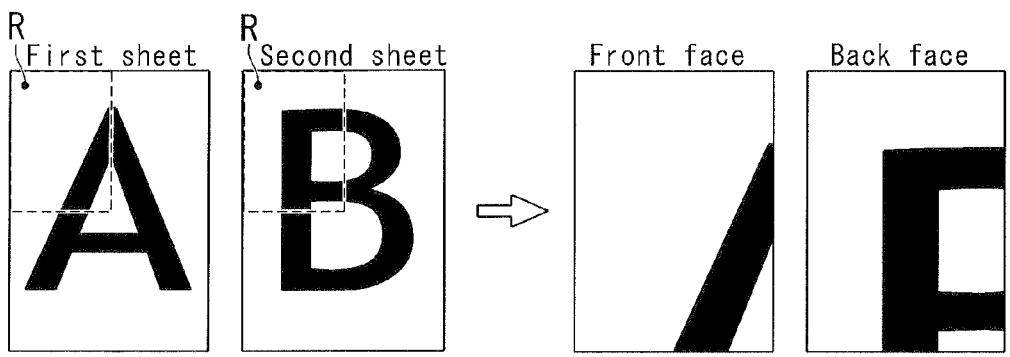
FIG. 23A and FIG. 23B are explanatory diagrams showing relationships between original documents and a printed output sheet in the case of double-side printing the single-sided original documents on the output sheet with the multi-function machine according to the embodiment.

FIG. 23A shows images of two single-sided original documents, and printed images of these original documents that are enlarge-printed on both sides of an output sheet in left-right binding. In this case, print ranges of the first and second original documents shown with dashed lines are determined while taking the point R on the top left corner as a reference when the top positions of the original documents are respectively positioned upward. The image within the print range of the first original document is printed on the front face of the output sheet, and the image within the print range of the second original document is printed on the back face of the output sheet.

Figure 23B:
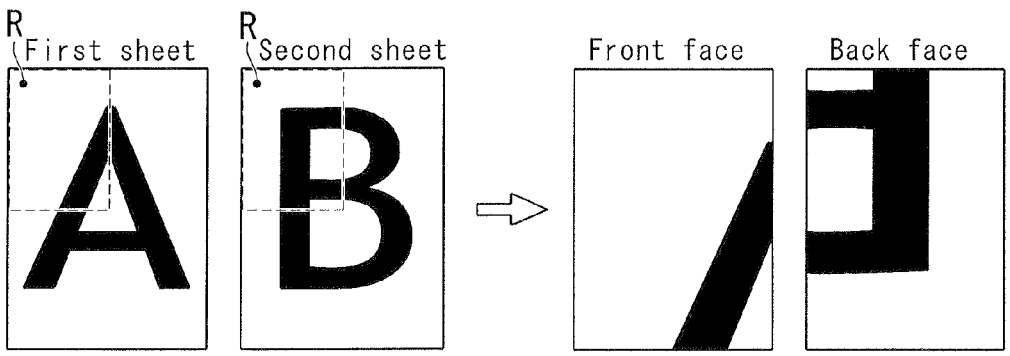

FIG. 23B shows images of two single-sided original documents, and printed images of these original documents that are enlarge-printed on both sides of an output sheet in top-bottom binding. In this case, as with the case of FIG. 23A, print ranges of the first and second original documents shown with dashed lines are respectively determined while taking the point R on the top left corner as a reference. The image within the print range of the first original document is printed on the front face of the output sheet, and the image within the print range of the second original document is printed on the back face of the output sheet. At this time, in order to have printing done on the output sheet in top-bottom binding, the image of the print range of the second original document is printed on the back face of the output sheet so as to be rotated 180 degrees within the plane about the center axis of the original document.

By having the configuration as described above, the range with a reference of the same position of the original document (top left corner which can be identified when the original document is placed such that the top position thereof is upward) can always be printed. Similarly, even if the direction of original document placement (top position) is in a direction different from that in FIG. 21A to FIG. 23B (the orientation of the original documents in FIG. 21A to FIG. 23B is far side facing; however, even if the orientation is left side facing), the corresponding image can be printed in the same manner as long as the top position setting section correctly sets the top position of the original document.

According to the present embodiment, the multi-function machine 101 having the double-side copying function includes: the original document detection section that detects the size of an original document and the original document size setting section that sets the size of the original document;

the original document top position setting section that sets the top position of the original document as required; the binding direction setting section that sets the binding direction of the original document and the binding direction of output sheets as required; the output size setting section that sets the output sheet size as required; the print magnification ratio setting section that sets the print magnification ratio as required; the print region determination section that determines the print region of the original document based on conditions set by the above respective setting sections; and the data box that stores original document data. Thereby the print region can be determined when printing the original document data stored in the data box, with reference to the top left corner which can be identified when the original document is placed such that the top position thereof is upward.

More specifically, the original document can be stored into the data box as image data with adding information with respect to the top position of the original document, the information being determined based on the parameters pre-set by the respective setting sections. For this reason, when outputting the stored original document data, printing can be performed based on the added information while taking the top left corner of the original document as a reference. As a result, how printing is going to result on an output sheet can be easily estimated by the user. In other words, when printing the original document data stored in the data box, the user's intended printed matter can be easily obtained.

Furthermore, the multi-function machine 101 is able to store not only original document data scanned in the image scanning section 117 but also data transferred from a PC connected via LAN to the multi-function machine 101. Note that data from a PC can be printed while taking the top left corner of the original document as a reference as described above by pre-adjusting the data on the PC so that the top position of the original document data is positioned upward. As described above, the multi-function machine 101 is able to handle various kinds of data, and the user can easily estimate how this data is going to be printed on an output sheet.

The technical scope of the present invention is not to be considered as being limited to the embodiment described above, and various modifications may be allowed without departing from the spirit or scope of the invention. The specific method illustrated in the present embodiment is merely an example, and it may be appropriately modified.

For example, the order of the respective settings may be interchanged (e.g., original document setting, output sheet size setting, and print magnification ratio setting) as long as the printing function is correctly performed.

The case of employing the image forming apparatus for a multi-function machine has been described in the present embodiment. However, the image forming apparatus may also be employed for a copying machine or a fax dedicated machine.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image forming apparatus which has a double-side copying function, comprising:
    at least either one of an original document detection section that detects a size of an original document, and an original document size setting section that sets a size of the original document as required;
    an original document top position setting section that sets a top position of the original document as required;
    a binding direction setting section that sets a binding direction of the original document and a binding direction of an output sheet as required;
    a top orientation determination section that determines an orientation of the top of a scanned data of the original document based on whether a front face or a back face of the original document is scanned, whether the original document is scanned by a table or an ADF, the binding direction of the original document set by the binding direction setting section, the top position of the original document set by the original document top position setting section, and whether the front face and the back face of the original document is simultaneously scanned or the front face and the back face of the original document is sequentially scanned in case of double-side copying;
    an output size setting section that sets a size of the output sheet as required;
    a print magnification ratio setting section that sets a print magnification ratio as required; and
    a copy region determination section that sets a copy region with reference to a top left corner of the original document based on the orientation of the top of the scanned data of the original document determined by the top orientation determination section, the top left corner being identified when the original document is placed such that the top position thereof is upward, wherein
    when the original document is scanned by the table, the orientation of the top of a scanned data of the original document is determined based on the top position of the original document set by the original document top position setting section,
    when a front face of the original document is scanned by the ADF, the orientation of the top of a scanned data of the original document is determined based on the top position of the original document set by the original document top position setting section, and
    when a back face of the original document is scanned by the ADF, the orientation of the top of a scanned data of the original document is determined based on the binding direction of the original document set by the binding direction setting section the top position of the original document set by the original document top position setting section, and whether the front face and the back face of the original document is simultaneously scanned or the front face and the back face of the original document is sequentially scanned.

2. The image forming apparatus according to claim 1, further comprising:
    an image processing section that performs image processing on scanned original document data based on a print magnification ratio set by the print magnification ratio setting section, and a copy region set by the copy region determining section; and
    a printing section that prints onto the output sheet an image corresponding to the data that has been image-processed by the image processing section.

3. The image forming apparatus according to claim 2, wherein in a case where a binding direction of an original document and a binding direction of an output sheet set by the binding direction setting section are different from each other, an image on a back face of an original document is printed by the printing section while being rotated 180 degrees within a plane thereof.

4. The image forming apparatus according to claim 1, further comprising a copy pattern setting section that sets any one of a double-side to double-side, double-side to single-side, single-side to double-side, and single-side to single-side as a copy pattern.

5. The image forming apparatus according to claim 4, further comprising:
- an image processing section that performs image processing on scanned original document data based on a print magnification ratio set by the print magnification ratio setting section, a copy region set by the copy region determining section, a copy pattern set by the copy pattern setting section, a binding direction of the original document and a binding direction of an output sheet set by the binding direction setting section; and
- a printing section that prints onto the output sheet an image corresponding to the data that has been image-processed by the image processing section.

6. The image forming apparatus according to claim 5, wherein when a binding direction of an original document and a binding direction of an output sheet set by the binding direction setting section are different from each other, an image on a back face of an original document is printed by the printing section while being rotated 180 degrees within a plane thereof.

7. An image forming apparatus which has a double-side copying function, comprising:
- at least either one of an original document detection section that detects a size of an original document, and an original document size setting section that sets a size of the original document as required;
- an original document top position setting section that sets a top position of the original document as required;
- a binding direction setting section that sets a binding direction of the original document and a binding direction of an output sheet as required;
- a top orientation determination section that determines an orientation of the top of a scanned data of the original document based on whether a front face or a back face of the original document is scanned, whether the original document is scanned by a table or an ADF, the binding direction of the original document set by the binding direction setting section, the top position of the original document set by the original document top position setting section, and whether the front face and the back face of the original document is simultaneously scanned or the front face and the back face of the original document is sequentially scanned in case of double-side copying;
- an output size setting section that sets a size of the output sheet as required;
- a print magnification ratio setting section that sets a print magnification ratio as required;
- a print region determination section that sets a print region with reference to a top left corner of the original document based on the orientation of the top of the scanned data of the original document determined by the top orientation determination section, the top left corner being identified when the original document is placed such that the top position thereof is upward; and
- a data box that stores data of a scanned original document, wherein
- when the original document is scanned by the table, the orientation of the top of a scanned data of the original document is determined based on the top position of the original document set by the original document top position setting section,
- when a front face of the original document is scanned by the ADF, the orientation of the top of a scanned data of the original document is determined based on the top position of the original document set by the original document top position setting section, and
- when a back face of the original document is scanned by the ADF, the orientation of the top of a scanned data of the original document is determined based on the binding direction of the original document set by the binding direction setting section, the top position of the original document set by the original document top position setting section, and whether the front face and the back face of the original document is simultaneously scanned or the front face and the back face of the original document is sequentially scanned.

8. The image forming apparatus according to claim 7, further comprising:
- an image processing section that performs image processing on original document data stored in the data box, based on a print magnification ratio set by the print magnification ratio setting section and a print region set by the print region setting section; and
- a printing section that prints onto an output sheet an image corresponding to the data that has been image-processed by the image processing section.

9. The image forming apparatus according to claim 8, wherein in a case where a binding direction of an original document and a binding direction of an output sheet set by the binding direction setting section are different from each other, an image on a back face of an original document is printed by the printing section while being rotated 180 degrees within a plane thereof.

10. The image forming apparatus according to claim 7, further comprising a print pattern setting section that sets double-sided or single-sided as a print pattern.

11. The image forming apparatus according to claim 10, further comprising:
- an image processing section that performs image processing on original document data stored in the data box based on a print magnification ratio set by the print magnification ratio setting section, a print region set by the print region setting section, a print pattern set by the print pattern setting section, and a binding direction of the original document and a binding direction of an output sheet set by the binding direction setting section; and
- a printing section that prints onto an output sheet an image corresponding to the data that has been image-processed by the image processing section.

12. The image forming apparatus according to claim 11, wherein when a binding direction of an original document and a binding direction of an output sheet set by the binding direction setting section are different from each other, an image on a back face of an original document is printed by the printing section while being rotated 180 degrees within a plane thereof.

* * * * *